(12) United States Patent
Tateyama et al.

(10) Patent No.: US 8,335,883 B2
(45) Date of Patent: Dec. 18, 2012

(54) DATA PROCESSING DEVICE AND DATA PROCESSING SYSTEM

(75) Inventors: Shohei Tateyama, Kodaira (JP); Takao Yamauchi, Hachioji (JP); Eisaku Tomida, Itami (JP); Kunihiko Nishiyama, Kanagawa (JP); Yasuyuki Suzuki, Kodaira (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 286 days.

(21) Appl. No.: 12/854,284

(22) Filed: Aug. 11, 2010

(65) Prior Publication Data
US 2011/0072184 A1 Mar. 24, 2011

(30) Foreign Application Priority Data

Sep. 18, 2009 (JP) ................................. 2009-216789

(51) Int. Cl.
*G06F 13/36* (2006.01)
*G06F 13/28* (2006.01)
(52) U.S. Cl. .............. 710/315; 710/7; 710/29; 710/107; 710/113; 710/308; 710/313
(58) Field of Classification Search ................ 710/7, 29, 710/107, 113, 308, 313, 315
See application file for complete search history.

(56) References Cited

U.S. PATENT DOCUMENTS

| 6,421,751 | B1 * | 7/2002 | Gulick | 710/107 |
| 7,469,304 | B2 * | 12/2008 | Saito et al. | 710/7 |
| 8,200,856 | B2 * | 6/2012 | Guo et al. | 710/29 |
| 2011/0099312 | A1 * | 4/2011 | Kondo | 710/113 |

FOREIGN PATENT DOCUMENTS
JP 2001-256173 A 9/2001

\* cited by examiner

*Primary Examiner* — Brian Misiura
(74) *Attorney, Agent, or Firm* — Miles & Stockbridge P.C.

(57) ABSTRACT

To provide a data processing device in which a plurality of CPUs can individually and independently communicate with different functions of a USB device using a single communication path. The data processing device is configured so that a USB host module to be coupled to a plurality of central processing units has a plurality of pipes to communicate with an arbitrary end point of a USB device coupled from the outside of the data processing device, the data processing device also includes an access control register to specify which central processing unit should have a right to control the pipe and specify to which extent a range of the content of setting of a function for the pipe should be allowed, and a USB host interface is controlled in accordance with the content of setting of the access control register.

29 Claims, 21 Drawing Sheets

FIG. 5

| END POINT NO. | ACCESS CPU | COMMUNICATION METHOD | TRANSFER DIRECTION | DATA |
|---|---|---|---|---|
| END POINT 0 | CPU1 | CONTROL TRANSFER | IN/OUT | SUBSCRIBER INFORMATION (CONFIDENTIAL INFORMATION) |
| END POINT 1 | CPU2 | BULK TRANSFER | IN | FILE DATA (MULTIMEDIA INCLUDED) |
| END POINT 2 | CPU2 | BULK TRANSFER | OUT | FILE DATA (MULTIMEDIA INCLUDED) |
| END POINT 3 | CPU2 | BULK TRANSFER | IN | ETHERNET PACKET |
| END POINT 4 | CPU2 | BULK TRANSFER | OUT | ETHERNET PACKET |

FIG. 6

| ACCESS CONTROL REGISTER NAME | CPU1 | CPU2 | ACCESS CONTROL METHOD |
|---|---|---|---|
| PIPE 0 | ○ | × | CPU SELECTION REGISTER |
| PIPE 1 | × | ○ | |
| PIPE 2 | × | ○ | |
| PIPE 3 | × | ○ | |
| PIPE 4 | × | ○ | |
| DEVICE ADDRESS = 0 | ○ | × | CPU SELECTION/ WRITE VALUE PERMISSION REGISTER |
| DEVICE ADDRESS = 1 | ○ | ○ | |
| END POINT SETTING = 0 | ○ | × | |
| END POINT SETTING = 1 | × | ○ | |
| END POINT SETTING = 2 | × | ○ | |
| END POINT SETTING = 3 | × | ○ | |
| END POINT SETTING = 4 | × | ○ | |
| CPU PORT | ○ | × | CPU SELECTION REGISTER |
| DMA PORT | × | ○ | |
| PROTOCOL ENGINE CONTROL | ○ | × | |

FIG. 7

| | EP15 | ... | EP5 | EP4 | EP3 | EP2 | EP1 | EP0 |
|---|---|---|---|---|---|---|---|---|
| DEVICE 0 | CPU1 | ... | CPU1 | CPU1 | CPU1 | CPU1 | CPU1 | CPU1 |
| DEVICE 1 | CPU1 | ... | CPU1 | CPU2 | CPU2 | CPU2 | CPU2 | CPU1 |
| DEVICE 2 | CPU1 | ... | CPU1 | CPU1 | CPU1 | CPU1 | CPU1 | CPU1 |
| ... | | | | | | | | |

DATA PROCESSING DEVICE AND DATA PROCESSING SYSTEM

CROSS-REFERENCE TO RELATED APPLICATION

The disclosure of Japanese Patent Application No. 2009-216789 filed on Sep. 18, 2009 including the specification, drawings and abstract is incorporated herein by reference in its entirety.

BACKGROUND OF THE INVENTION

The present invention relates to a data processing device comprising a function for a plurality of central processing units (CPU) to communicate with an external USB (Universal Serial Bus) device using one physical communication path and, to technology which is effective when applied to, for example, a semiconductor data processing device for mobile communication.

A USB interface module to be interfaced with a USB device has a plurality of pipes (PIPE) including a FIFO (First-in First-out) buffer etc. and controls communication with a specific end point by specifying a device address and an end point of the USB device for each pipe. A transaction transmitted/received between a pipe and an end point is managed by a USB protocol engine within a USB module. A transaction includes a token packet including a device address, an end point, etc., a data packet including data to be transmitted/received, a handshake packet to return information about success or failure of communication, etc. The USB protocol engine communicates with the USB device by transmitting/receiving each packet to/from the USB device and writes/reads transmission/reception data to each pipe. When there are requests for communication from the pipes, the USB protocol engine switches the pipes for each transaction to avoid the occupation of the communication path by one pipe.

Patent Document 1 (Japanese Patent Laid-Open No. 2001-256173) describes the invention that allows a plurality of CPUs to use one USB device in a time-division manner. That is, any one of the CPUs that selectively use the USB device serves as a main host, which is substantially a host of a system, and the other CPUs each serve as a sub host, and the main host temporarily receives data to be transmitted to the USB device from each sub host and transfers the data to the corresponding USB device, and temporarily receives data to be transmitted to the corresponding sub host from the USB device and transfers the data to the corresponding sub host, and thus, the USB device is controlled so as to be used exclusively by each sub host. Due to this, a plurality of hosts seems to exist in one system, however, one of the hosts serves as a main host and the USB device is controlled so as to be used exclusively by the other sub hosts, and thereby, a sub host is recognized as one USB device by the main host. Hence, it is made possible for the hosts to use one USB device in a time-division manner and there is no need of each host switching a device to a hub of a system to which the host belongs, and thus, convenience can be improved.

SUMMARY OF THE INVENTION

According to the technique described in Patent Document 1, however, it is required for a CPU, which serves as a sub when a plurality of CPUs communicates with the USB device in a time-division manner, to be controlled by a CPU that serves as a master, and hence, it is not possible to establish communication by a sub CPU unless the master CPU is operable and thus, there is a limit to the improvement of throughput of USB communication in this point. Further, when a sub CPU establishes communication, it is necessary to reboot if the master CPU is in the sleep state and thus power consumption is increased. Furthermore, there is a case where the confidentiality of communication information cannot be guaranteed because of the involvement of the master CPU in communication by a sub CPU, and overhead occurs when information is transferred between CPUs.

The inventors of the present invention have made the following examinations of communication that a plurality of CPUs establishes individually and independently with a USB device using one physical communication path.

For example, we have supposed a USB device that comprises a USIM (Universal Subscriber Identity Module) used for terminal authentication of a mobile communication terminal and a general-purpose storage module in a card substrate and which is coupled to a mobile communication terminal via a USB interface and examined individual and independent communication by two CPUs of the mobile communication terminal with different functions of the USB device. Specifically, it is assumed that a first CPU communicates with an end point 0 and a second CPU communicates with end points 1 to 4 and the first CPU communicates with the end point 0 (corresponding to a function 1) to read subscriber information and to confirm the existence of USIM. The second CPU communicates with the end points 1 and 2 (corresponding to a function 2) to read/write from/to the storage module and communicates with the end points 3 and 4 (corresponding to a function 3) to transmit/receive an Ethernet (registered trademark) frame. However, the inventors of the present invention have found that there are following problems to be solved in the above-mentioned case.

Firstly, if a CPU accesses a pipe being used by another CPU, the communication is impeded. If a plurality of CPUs accesses the same end point of the same device, the communication is impeded by one another. Such a collision needs to be suppressed.

Secondly, when the use of resources by the CPUs is controlled exclusively using a semaphore of OS in order to avoid a collision, one CPU occupies the access to the USB device unless the access right by semaphore management is switched to another, and in the meantime, the other CPUs cannot access the USB device, and thus, data processing efficiency is reduced.

Thirdly, by simple semaphore management, it is not possible to restrict an endpoint of the USB device each CPU accesses, and thus, it is not possible to restrict a specific CPU from accessing confidential information and the security cannot be maintained.

Fourthly, if no control is performed to specify to which CPU an interrupt should be given when an interrupt request is issued during USB communication, CPUs not related to the processing need to be determined to reply to the interrupt each time, and thus, the original data processing efficiency is reduced.

Fifthly, in order to establish USB communication, it is necessary to perform enumeration to set a device address to the USB device coupled, and it is necessary for one of the CPUs to support the communication. After that, each CPU communicates with an end point, however, in this case, the device address set by the enumeration and received information of the end point (about packet size, transmission/reception direction, protocol, etc.) are indispensable and it is necessary to transmit/receive the information between a plurality of CPUs.

The present invention has been made in view of the above circumstances and provides a data processing device and further, a data processing system in which a plurality of CPUs is capable of individual and independent communication with different functions of a USB device using a single communication path.

The other purposes and the new feature of the present invention will become clear from the description of the present specification and the accompanying drawings.

The following explains briefly the outline of a typical invention among the inventions disclosed in the present application.

That is, a data processing device is configured so that a USB host module to be coupled to a plurality of central processing units has a plurality of pipes to communicate with an arbitrary end point of a USB device coupled from the outside of the data processing device and includes an access control register to specify which central processing unit should have a right to control the pipe and specify to which extent a range of the content of setting of a function for the pipe should be allowed, and a USB host interface is controlled in accordance with the content of setting of the access control register.

The following explains briefly the effect acquired by the typical invention among the inventions disclosed in the present application.

That is, a plurality of CPUs is capable of individual and independent communication with different functions of a USB device using a single communication path.

BRIEF DESCRIPTION OF THE DRAWINGS

FIG. 5 is an explanatory diagram showing an example of a coupling mode of a USB device to a USB host module;

FIG. 6 is an explanatory diagram showing a setting of an access control register;

FIG. 7 is an explanatory diagram showing a setting example of a write value permission, register;

DETAILED DESCRIPTION OF THE PREFERRED EMBODIMENTS

1. Outline of Embodiment

Figure 1:
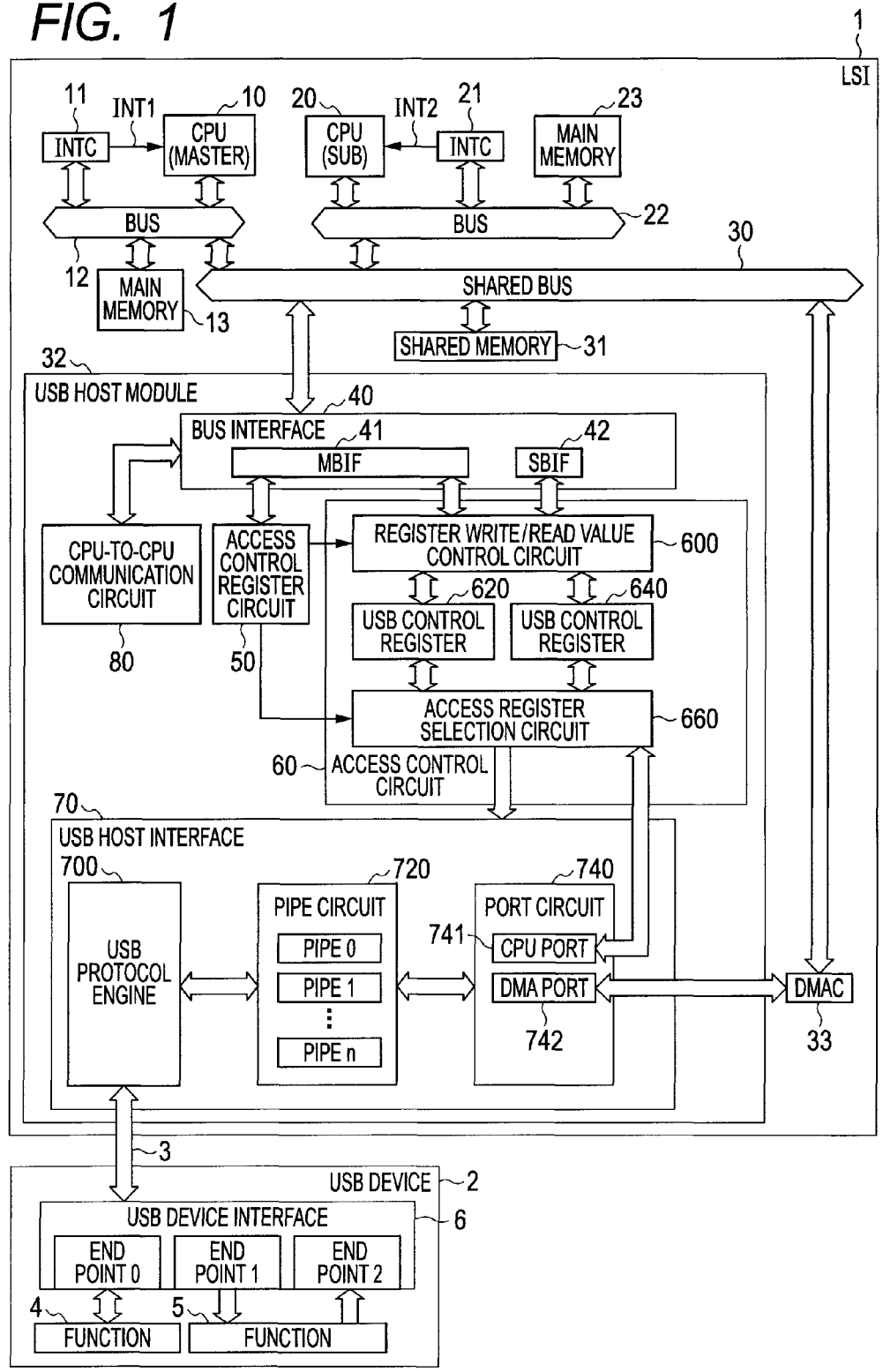
FIG. 1 is a block diagram showing a data processing device 1 according to the present invention and an example of a USB device to be coupled thereto.

First, an outline of a typical embodiment of the invention disclosed in the present application will be described. In the description of the outline of a typical embodiment, reference symbols with brackets in the drawing referred to in the description of the outline only illustrate those included in the concept of the components to which the reference symbols are attached.

[1] A data processing device according to a typical embodiment of the present invention has a plurality of central processing units (10, 20) and a USB host module (32, 32A) coupled to the central processing units. The USB host module has a USB host interface (70) to which a USB device is coupled from the outside of the data processing device, a bus interface (40) coupled to the central processing units, an access control register circuit (50) coupled to the bus interface and accessed by a specific central processing unit, and an access control circuit (60, 60A) that controls the USB host interface in accordance with the content set to the access control register circuit. The USB host interface has a pipe circuit (720) having a plurality of pipes to communicate with an arbitrary end point of the USE device coupled from the outside of the data processing device and a USB host protocol engine (700) that processes a transaction transfer request from the pipe. The access control register circuit has a first access control register (502) that specifies which central processing unit should have the right to control the pipe. The access control circuit conveys only the control information from the central processing unit having the access right to the pipe in accordance with the setting of the first access control register for each pipe.

Due to this, it is enabled to arbitrarily set a correspondence relationship between pipe and central processing unit by the first access control register. It is easy to avoid communication contention and it is possible for central processing units to establish communication in a time-division manner using one communication path. Further, data transfer is more versatile compared to semaphore management and it is possible to contribute to improvement of data processing efficiency. Furthermore, it is possible to restrict a CPU from accessing confidential information.

[2] In the data processing device in paragraph [1], the access control register circuit has, for example, a second access control register (501) that specifies which central processing unit should have the right to control the USB host protocol engine. The access control circuit conveys only the control information from the central processing unit specified by the second access control register to the USB host protocol engine.

Due to this, in a case also, where a specific central processing unit serves as a master to control the USB interface, it is possible to obtain flexibility to allow another central processing unit to have the right to control the USB host protocol engine.

[3] In the data processing device in paragraph [1] or [2], the USB host interface has, for example, a CPU port (741) that performs input and output of a transaction with the central processing unit for the pipe of the pipe circuit. The access control register circuit has a third access control register (503) that specifies which central processing unit should have the right to control the CPU port. The CPU port performs input and output of a transaction with a CPU having the control right granted by the third access control register.

Due to this, it is possible to programmably control to which pipe the CPU port should be allocated or with which CPU the CPU port should perform input and output of a transaction.

[4] The data processing device in any of paragraphs [1] to [3] has, for example, a DMA controller (33). The USB host interface has a DMA port that performs input and output of a transaction with the DMA controller for the pipe of the pipe circuit. The access control register circuit has a fourth access control register (504) that specifies which central processing unit should have the right to control the DMA port. The DMA port performs input and output of a transaction in accordance with data transfer control under the transfer condition set to the DMA controller by the CPU having the control right granted by the fourth access control register.

Due to this, it is possible to programmably control to which pipe the DMA port should be allocated or with which CPU the DMA port should perform input and output of a transaction.

[5] In the data processing device in paragraph [3] or [4], the access control register circuit has, for example, a fifth access control register (505, 507) that specifies a function allocatable to the pipe for each pipe. The access control circuit restricts control information to be conveyed to the pipe to a range set to the fifth access control register.

Due to this, it is enabled to arbitrarily set a correspondence relationship between the end point of the USB device and the pipe by the fifth access control register.

[6] In the data processing device in paragraph [5], the control information to be conveyed to the pipe includes, for example, an end point number and a device address.

[7] In the data processing device in paragraph [6], the access control circuit includes a USB control register (620, 640) that stores, for example, control data from the central processing unit for each central processing unit and also has a write value control circuit (601, 603) that restricts writing of the control data from the central processing unit to the USB control register in accordance with the content of the fifth access control register (first embodiment).

Due to this, it is possible to easily achieve a configuration in which a correspondence relationship between the end point of the USB device and the pipe etc. is arbitrarily set.

[8] In the data processing device in paragraph [7], the access control circuit has, for example, an access register selection circuit (660) coupled to the USB control register and the access register selection circuit selects the content of the USB control register corresponding to the central processing unit specified by the first control register to the fourth control register and gives the content to the USB host interface circuit (first embodiment).

It is possible to easily achieve coupling between the USB host interface circuit and the USB control register.

[9] In the data processing device in paragraph [6], the access control circuit includes, for example, a USB control register (650) that stores control data from the central processing unit and also has the write value control circuit (601, 603) that restricts writing of the control data from the central processing unit to the USB control register in accordance with the content of the fifth access control register (second embodiment).

Due to this, it is possible to easily achieve a configuration in which a correspondence relationship between the end point of the USB device and the pipe etc. is arbitrarily set.

[10] In the data processing device in paragraph [9], the access control circuit has, for example, a write enable/disable control circuit (605, 606) coupled to the USB control register. The write enable/disable control circuit refuses writing to the USB control register by a central processing unit other than the central processing unit specified by the first control register to the fourth control register (second embodiment 2).

Due to this, it is possible to make common the USB control register to a plurality of central processing units.

[11] In the data processing device in paragraph [1], the access control circuit has, for example, an interrupt request control circuit (670, 671) that supplies an interrupt request from each pipe to the central processing unit specified by the first control register.

Due to this, it is possible to specify the central processing unit that responds to the interrupt request from the pipe in association with the CPU having the right to control the pipe.

[12] The data processing device in paragraph [1] has, for example, a communication circuit (91, 92) that performs mutual communication between one central processing unit and another of the central processing units. The communication circuit has a memory circuit (920) in which information intended to be communicated is stored in such a manner that the central processing unit can write and read, and the central processing unit that intends to establish communication makes an interrupt request to a central processing unit of the other party of communication by setting a communication flag (921, 922) upon receipt of an interrupt permission from the central processing unit of the other party of communication.

It is possible to notify another central processing unit of the result of enumeration acquired by a specific central processing unit and by using an interrupt for the notification, the load of the central processing unit can be reduced and the recognition is increased in speed compared to the recognition by polling.

[13] A data processing device according to another embodiment of the present invention (third embodiment) has a plurality of central processing units and a USB host module (32B) coupled to the central processing units. The USB host module has a USB host interface (70B) to which a USB device is coupled from the outside of the data processing device, the bus interface (40) coupled to the central processing units, an access control register circuit (50B) coupled to the bus interface and accessed by a specific central processing unit, and an access control circuit (60B) that controls the USB host interface in accordance with the content set to the access control register circuit. The USB host interface has a pipe circuit (731, 732) having a plurality of pipes to communicate with an end point of the USB device coupled from the outside of the data processing device, the pipe circuit being individualized for each of the central processing units, a CPU port (751, 752) that performs input and output of a transaction between the pipe circuit and the central processing unit, the CPU port being individualized for each of the central processing units, and a USB host protocol engine (700) that processes a transaction transfer request from the pipe. The access control register circuit specifies a function allocatable to the pipe for each pipe. The access control circuit has a USB control register (680, 681, 681C) to which information to control the USB host interface is individualized and set for each of the central processing units and restricts control information to be set to the USB control register to a range set to the access control register.

It is also possible to obtain the same effect as that in paragraph [1] even when the pipe circuit and the CPU port are individualized for each central processing unit.

[14] In the data processing device in paragraph [13], the control information to be conveyed, for example, to a pipe includes an end point number and a device address.

[15] In the data processing device in paragraph [14], only the USB control register corresponding to, for example, the specific central processing unit can store control information to be conveyed to the USB host protocol engine.

[16] The data processing device in paragraph [15] has, for example, a DMA controller. The USB host interface has a DMA port that performs input and output of a transaction with the DMA controller for the pipe of the pipe circuit, the DMA port being individualized for each of the central processing units. The DMA port performs input and output of a transaction in accordance with data transfer control under the transfer condition set to the DMA controller by the corresponding CPU.

[17] In the data processing device in paragraph [13], the USB control register (681C) corresponding to the central processing unit (20) other than the specific central processing unit (10) can be manipulated by the specific central processing unit (fourth embodiment).

Here, a case is supposed, where the USB devices are made attachable and detachable. When the setting of the USB control register corresponding to the USB device is left unchanged after the USB device that has been in communication with a central processing unit other than the specific central processing unit is removed, if a device address having the same setting as that is allocated newly to the specific central processing unit, it is possible for the specific central processing unit to access the device under the same condition as that of the setting of the other central processing unit, and thus, the security is violated, resulting in a big problem. At this time, it is made possible to previously prevent the occurrence of such a problem by individually manipulating the setting about the pipe to be used newly by the specific central processing unit without the need to reset all of the pipes following the removal of one USB device when the USB devices are made attachable and detachable.

[18] In the data processing device in paragraph [17], control information that can be manipulated by, for example, the specific central processing unit, is information about an end point number and a device address.

[19] The data processing device in paragraph [1] or [13] has, for example, a serial interface module (102) that supports another serial interface made available selectively for the USB host module.

Due to this, the data processing device is enabled to accept an external device having another serial interface.

[20] In the data processing device in paragraph [19], the serial interface module is, for example, a UART interface module.

[21] In the data processing device in paragraph [19] or [20], for example, part of terminals to be coupled to the USB host module of the external terminals of the data processing device and the terminal to be coupled to the serial interface module are common terminals (124, 125). Due to the multifunctional terminal, it is possible to reduce the number of external terminals.

[22] A data processing system according to a typical embodiment from another viewpoint of the present invention has, for example, the data processing device in paragraph [21] and a device control circuit (130) that is coupled to the data processing device via the terminal to be coupled to the USB host module of the external terminals of the data processing device and the terminal to be coupled to the serial interface module, and is also coupled to an external device detachably. The device control circuit supplies a first power supply voltage or a second power supply voltage to an external device coupled to the device control circuit as an operating power supply and controls a correspondence between the external terminal to be coupled to the data processing device and the external terminal to be coupled to the external device. The data processing device instructs the device control circuit to supply the first power supply voltage to the external device and also instructs it to establish communication using the USB host module. Then, when there is a first reply in response to this instruction from the external device, the data processing device selects the use of the USB host module and deselects the use of the serial interface module. When not receiving the first reply, the data processing device instructs the device control circuit to supply the second power supply voltage to the external device, and also instructs it to establish communication using the USB host module. When there is a second reply in response to this instruction from the external device, the data processing device selects the use of the USB host module and deselects the use of the serial interface module and when not receiving the second reply, deselects the use of the USB host module and selects the use of the serial interface module.

Due to this, it is possible to include a plurality of different kinds of USB interface having different power supply voltages and further, to accept an external device and further, an external device supporting another serial interface.

[23] In the data processing system in paragraph [22], for example, the first power supply voltage is 1.8 V and the second power supply voltage is 3.0 V.

2. Details of Embodiments

Embodiments will be described in more detail.

<<System Configuration of First Embodiment>>

FIG. 1 shows an example of a data processing device according to the present invention and a USB device coupled thereto. A data processing device 1 is configured as, although not limited in particular, a system-on-chip semiconductor device (LSI) formed over one semiconductor substrate, such as single crystal silicon, by complementary MOS integrated circuit manufacturing technology etc. The data processing device 1 performs, for example, application processing, such as base band processing for mobile communication, image processing, and voice processing. A USB device 2 includes, although not limited in particular, a plurality of functions 4 and 5, such as USIM used in terminal authentication of a mobile communication terminal and a general-purpose storage module, and a USB device interface 6 and is coupled to the semiconductor device 1 detachably via a single USB communication path 3. The USB device interface 6 has a plurality of buffers for USB transfer, called an end point. According to the USB standards, a full-speed device has up to 16 end points. In the figure, an end point 0 (EP0), an end point 1 (EP1), and an end point 2 (EP2) are shown typically. For each end point, an endpoint number, transfer direction, transfer method, and maximum packet size are defined. The end point 0 supports control transfer and all of the USB devices must have the end point 0. The control transfer is used in configuration of a USB device and transmission/reception of message. The other end points are allocated to bulk transfer used for transfer of a large amount of data of a printer, storage, etc., isochronous transfer used for data transfer that requires real time processing such as audio and telephone call. Although not limited in particular, the function 4 is a USIM and transfer by the end point 0 is applied. The function 5 is a nonvolatile storage and transfer by the end point 1 and end point 2 is applied.

The data processing device 1 includes a plurality of central processing units (CPU) 10 and 20 each fetching and executing a command, the respective central processing units are coupled to specific buses 12 and 22, the buses 12 and 22 are coupled to a shared bus 30, and to the shared bus 30, a USB host module 32 is coupled. To the bus 12, a main memory 13, an interrupt controller (INTC) 11, etc., shown typically are coupled. To the bus 22, a main memory 23, an interrupt controller (INTC) 21, etc., shown typically are coupled. To the shared bus 30, a shared memory 31, the USB host module 32, and a DMA (Direct Memory Access) controller 33 are coupled. The main memories 13 and 23 are used as a work region or temporary memory region of the corresponding CPU (first CPU) 10 and CPU 20. The interrupt controller 11 outputs an interrupt signal INT1 to the CPU 10 based on an interrupt request from the USB host module 32 etc. The interrupt controller 21 outputs an interrupt signal INT2 to the CPU (second CPU) 20 based on an interrupt request from the USB host module 32 etc. Although not limited in particular, the buses 12 and 22 and the shared bus 30 are used as a split transaction bus and a circuit (initiator) that makes a request for access outputs a request packet to the bus and a circuit (target) to be accessed returns a response packet to the initiator after processing to respond to the received request packet. The request packet has the address of the initiator (initiator address) that makes a request for access, the address of the target (target address) to be accessed, an access command indicative of the content of the access, and when necessary, write data. A router disposed on the bus transfers the request packet to the target indicated by the target address included in the request packet and delivers the response packet to the initiator indicated by the response address included in the response packet.

The USB host module 32 has a USB host interface 70 to which the USB device 2 is coupled, a bus interface 40 coupled to the shared bus, an access control register circuit 50 coupled to the bus interface 40 and accessed by a specific central processing unit, for example, the CPU 10, an access control circuit 60 that controls the USB host interface in accordance with the content set to the access control register circuit 50, and a CPU-to-CPU communication circuit 80.

Figure 2:
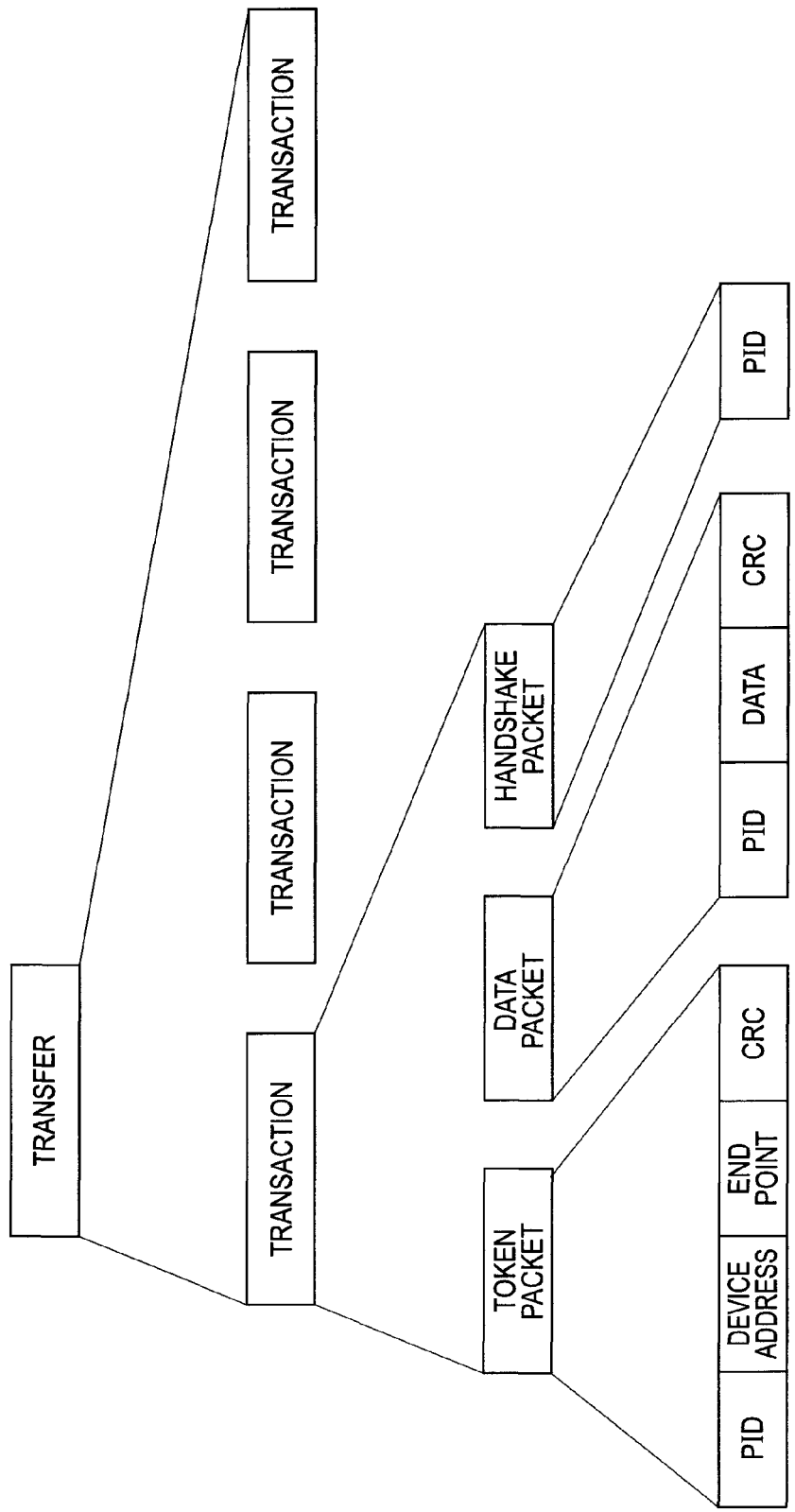
FIG. 2 is an explanatory diagram for illustrating a configuration of a transfer used in USB communication.

The USB host interface 70 has a USB protocol engine 700 that performs control of USB communication, that is, control of communication, reset, attach, detach, etc., a pipe circuit 720 including a plurality of pipes to communicate with respective end points, and a port circuit 740 that transmits and receives data, that is a transaction, to and from the pipe circuit 720. The pipe circuit 720 has a plurality of pipes of pipe 0 (PIPE0) to pipe n (PIPEn). The port circuit 740 has a CPU port 741 that transmits and receives a transaction between each pipe and the bus interface 40 and a DMA port 742 that transmits and receives a transaction between each pipe and the DMA (Direct Memory Access) controller 33. The pipe receives a transaction via the CPU port 741 or the DMA port 742. The device address and the end point of the USB device 2 are specified for each pipe, and thus, the USB host interface 70 controls communication with a specific end point. A transaction to be transmitted and received between the pipe and the end point is managed by the USB protocol engine 700 within the USB module. As illustrated in FIG. 2, a transaction constituting transfer includes a token packet including a device address, an end point, etc., a data packet including data to be transmitted and received, a handshake packet that returns success/failure of communication, etc. The USB protocol engine 700 communicates with the USB device 2 by transmitting and receiving each packet thereto and therefrom, and writes/reads transmitted/received data to and from each pipe. When a plurality of pipes makes a request for communication, control is performed so that the pipe is switched to another for each transaction so that the communication path is not occupied by one pipe. For example, when the pipe 0 and the pipe 1 are used, the USB protocol engine 700 performs control to process transactions of different pipes alternately and in a time-division manner, that is, when informed of the completion of the transaction of the pipe 0 from the USB device, the USB protocol engine 700 switches to execute another transaction, if any, which is left unexecuted in the pipe 1. The CPU port 741 inputs and outputs a transaction between the bus interface 40 and the pipe.

It is possible for the bus interface 40 to identify the CPU that has accessed based on access source identification information to be transmitted from the shared bus 30, for example, source ID information, such as an initiator address. A master bus interface (MBIF) 41 is used to receive access from the CPU 10 and reply to the access. A sub bus interface (SBIF) 42 is used to receive access from the CPU 11 and reply to the access.

Figure 3:
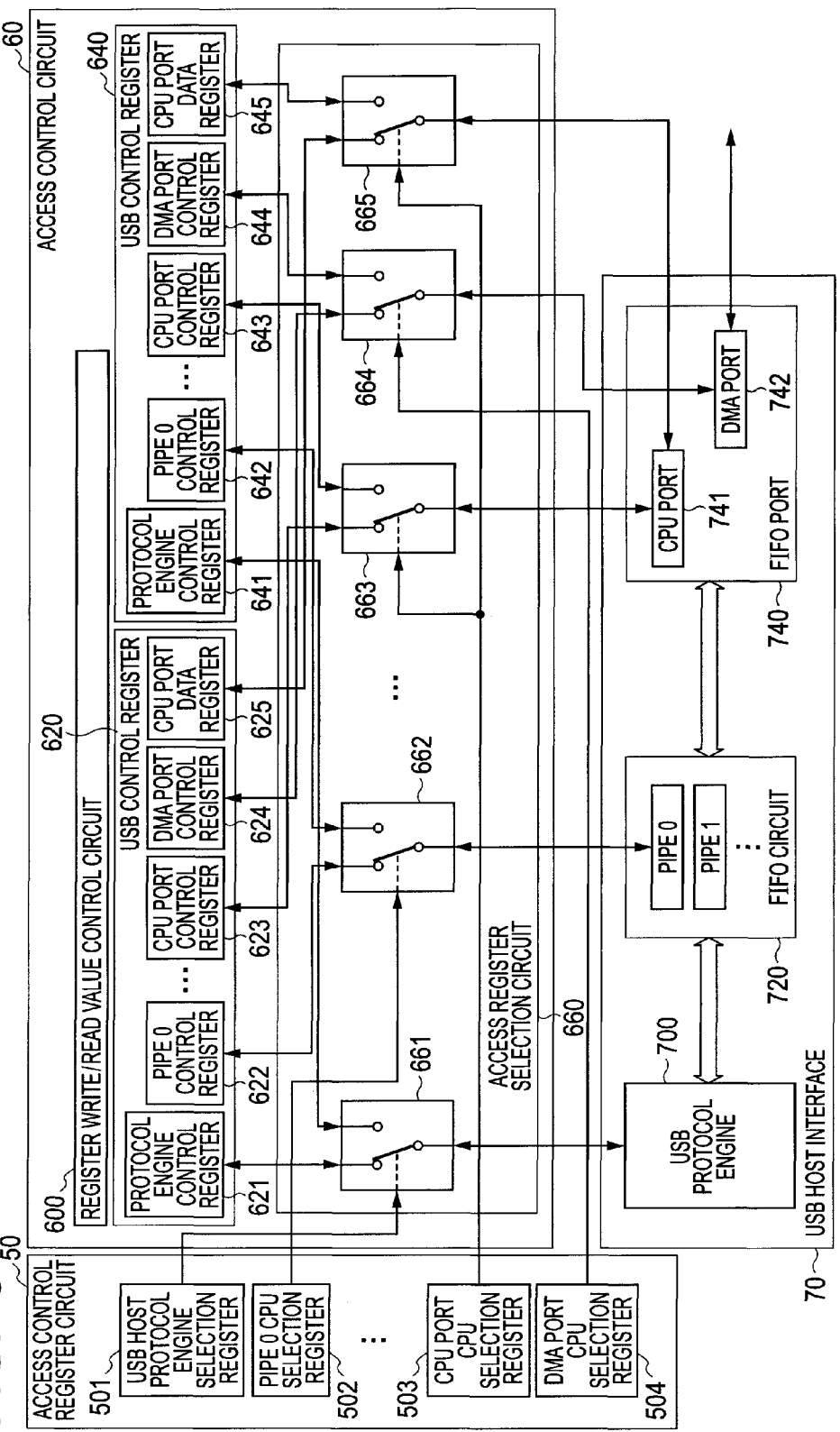
FIG. 3 is a block diagram particularly showing a specific example of a USB control register and an access register selection circuit in an access control circuit.
Figure 4:
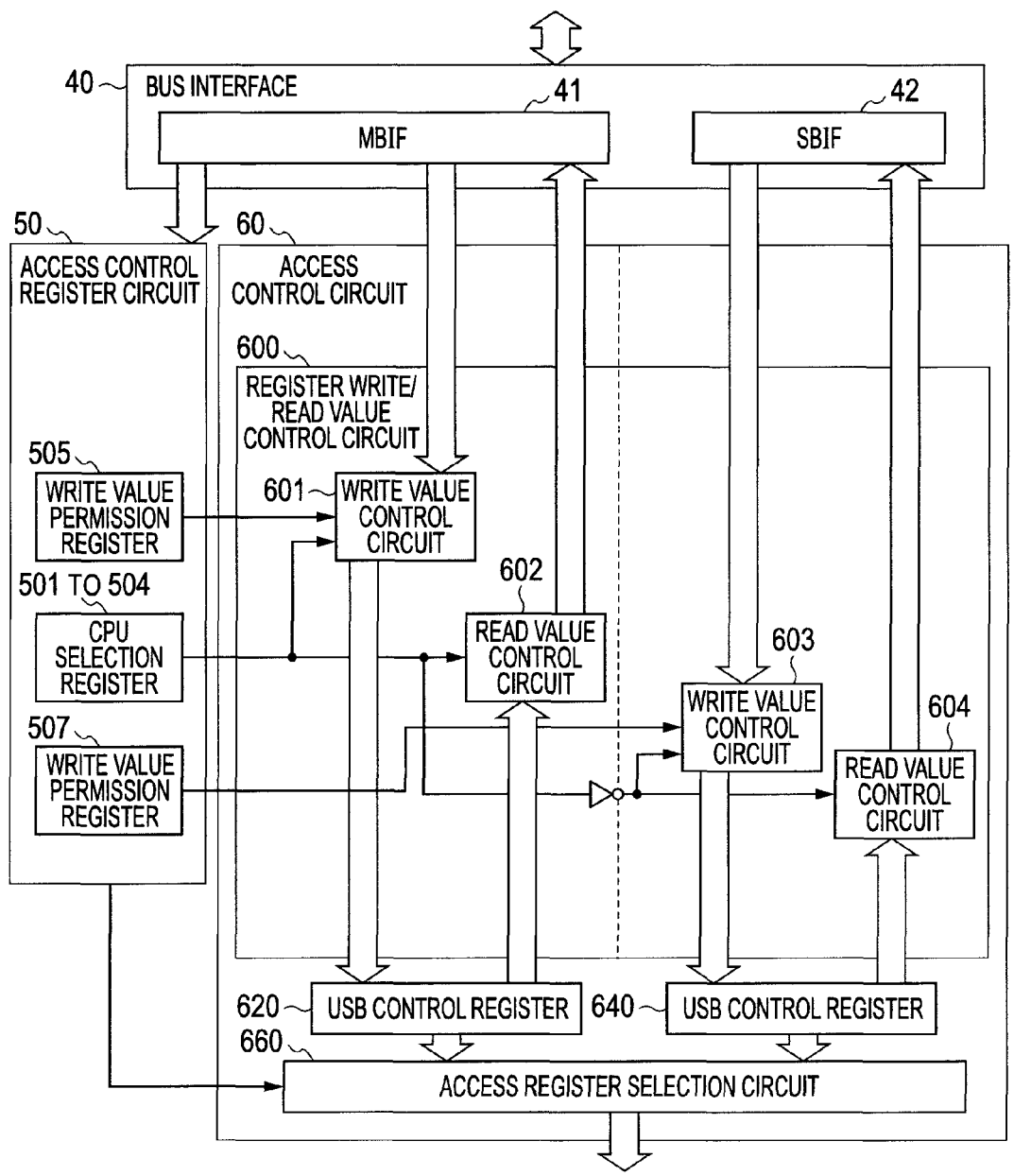
FIG. 4 is a block diagram particularly showing a specific example of a register write/read value control circuit in an access control circuit.

The access control register circuit 50 includes a register, illustrated in FIG. 3, which specifies which of the CPU 10 and CPU 20 can access the respective pipes PIPE0 to PIPEn, the CPU port 741, the DMA port 742, the USB protocol engine 700, etc., and a register, illustrated in FIG. 4, which controls values, such as an end point address and a device address that can be set by the respective CPUs 10 and 20. Only the specific CPU 10 can access each register of the access control register circuit 50. In summary, the access control register circuit 50 is coupled to the shared bus 30 via the master bus interface circuit 41.

The access control circuit 60 has a register write/read control circuit 600, a USB control register 620 dedicated to the CPU 10, a USB control register 640 dedicated to the CPU 20, and an access register selection circuit 660. The USB control registers 620 and 640 are a register group for controlling the USB host interface 70 and each include a plurality of registers, illustrated in FIG. 3, which stores information to control the pipes PIPE0 to PIPEn, the CPU port 741, the DMA port 742, and the protocol engine 700.

<<Access Control Register Circuit and USB Control Register in First Embodiment>>

The control function of the access control register circuit 50 and the USB control registers 620 and 640 is further described in more detail with reference to FIG. 3 and FIG. 4.

As described above, the USB control register 620 is dedicated, to the CPU 10 and the USB control register 640 is dedicated to the CPU 20, and both have write value permission resisters 505 and 507 illustrated in FIG. 4 in order to set a range of value that can be written to the USB control registers 620 and 640, respectively, from the CPUs 10 and 20, respectively. As illustrated in FIG. 4, the register write/read value control circuit 600 includes a write value control circuit 601 that restricts a value to be written to the USB control register 620 from the CPU 10 to the range of value according to the set values of the write value permission register 505. Similarly, the register write/read value control circuit 600 includes a write value control circuit 603 that restricts a value to be written to the USB control register 640 from the CPU 20 to the range of value according to the set values of the write value permission register 507.

As illustrated in FIG. 3, the USB control register 620 has a protocol engine control register 621 to which control information for the protocol engine 700 is set, a pipe PIPE0 control register 622, . . . , to which an end point number, a device address, etc., to be made to correspond thereto are set, a CPU port control register 623 to which a number of a pipe to be coupled etc. is set, a DMA port control register 624 to which a number of a pipe to be coupled etc. is set, and a CPU port data register 625 that holds data to be input and output from and to a CPU port. Similarly, as illustrated, in FIG. 3, the USB control register 640 also has a protocol engine control register 641 to which control information for the protocol engine 700 is set, a pipe PIPE0 control register 642, . . . , to which an end point number, a device address, etc., to be made to correspond thereto are set, a CPU port control register 643 to which a number of a pipe to be coupled etc. is set, a DMA port control register 644 to which a number of a pipe to be coupled etc. is set, and a CPU port data register 645 that holds data to be input and output from and to a CPU port.

For example, the write value control circuit 601 (603) invalidates the writing by the CPU 10 (CPU 20) if an end point number and a device address that the CPU 10 (CPU 20) tries to write to the pipe 0 control register 622 are not values permitted by the access write value permission register 505 (507). Further, the write value control circuit 601 (603) invalidates the writing by the CPU 10 (CPU 20) if a pipe number that the CPU 10 (CPU 20) tries to write to the CPU port control register 623 (643) is not a value permitted by the access write value permission register 505 (507). The register write/read value control circuit 600 includes a read value control circuit 602 that controls a value to be read from the USB control register 620 to the master bus interface 41 and a read value control circuit 604 that controls a value to be read from the USB control register 640 to the sub bus interface 42, and prevents the reading from the USB control registers 620 and 640 on the side of the CPU not permitted by CPU selection registers 501 to 504 in FIG. 2, to be described later. In FIG. 4, for example, when the CPU 10 is selected by the CPU selection register 502, the reading of the pipe 0 control register is possible only from the USB control register 620, and thus, trouble is prevented in advance from occurring, which would be caused when meaningless data is read from the USB control register 640 that is not selected.

The CPU selection registers 501 to 504 determine which control information to use to control the USB interface 70, between control information written to the USB control register 620 and control information written to the USB control register 640 in the range of values that can be written specified by the write value control registers 505, 507. According to the configuration in FIG. 3, the USB host protocol engine selection register 501 causes a switch 661 to select a value of the protocol engine control register 621 of the USB control register 620 or a value of the protocol engine control register 641 of the USB control register 640 and supplies the value to the USB protocol engine 700. The pipe 0 CPU selection register 502 causes a switch 662 to select a value of the pipe 0 control register 622 of the USB control register 620 or a value of the pipe 0 control register 642 of the USB control register 640 and supplies the value to the pipe 0. Although not shown schematically, the other pipe 1 to pipe n perform in the same way. The CPU port selection register 503 causes a switch 663 to select a value of the CPU port control register 623 of the USB control register 620 or a value of the CPU port control register 643 of the USB control register 640 and supplies the value to a CPU port 741 and causes a switch 665 to select a value of the CPU port data register 625 of the USB control register 620 or a value of the CPU port data register 645 of the USB control register 640 and supplies the value to the CPU port 741. The DMA port selection register 504 causes a switch 664 to select a value of the DMA port control register 624 of the USB control register 620 or a value of the DMA port control register 644 of the USB control register 640 and supplies the value to the DMA port 742. Although not limited in particular, the setting of the data transfer condition for the DMA controller 33 is permitted only to the CPU 20, and therefore, a configuration in which a data register of the DMA port 742 is associated selectively with one of the CPU 10 and the CPU 20 is not employed and the configuration is different from that of the CPU port 741 for a data register.

An example of setting for the access control register circuit and the USB control register is described. In FIG. 5, an example of the use of the USB device 2 is shown in a correspondence between an end point number and an access CPU. In FIG. 6, an example of setting for the access control register circuit 50 in accordance with the use example in FIG. 5 is shown. The access right of a CPU to a pipe is determined by the setting of the CPU selection register 502, . . . , and the right of a CPU to access the CPU port 741, the DMA port 742, and the USB protocol engine 700 is determined by the settings of the CPU selection registers 501, 503 and 504. The set values of the device address and the end point are determined in accordance with the write value control to the pipe control registers 622, . . . , 624, . . . , by the write value permission registers 505 and 507. The content of the write value permission registers 505 and 507 in this case are not limited in particular, however, as illustrated in FIG. 7, the content is supposed to be one in which a CPU that can access a combination of an end point number and a device address is explicitly specified.

Figure 8:
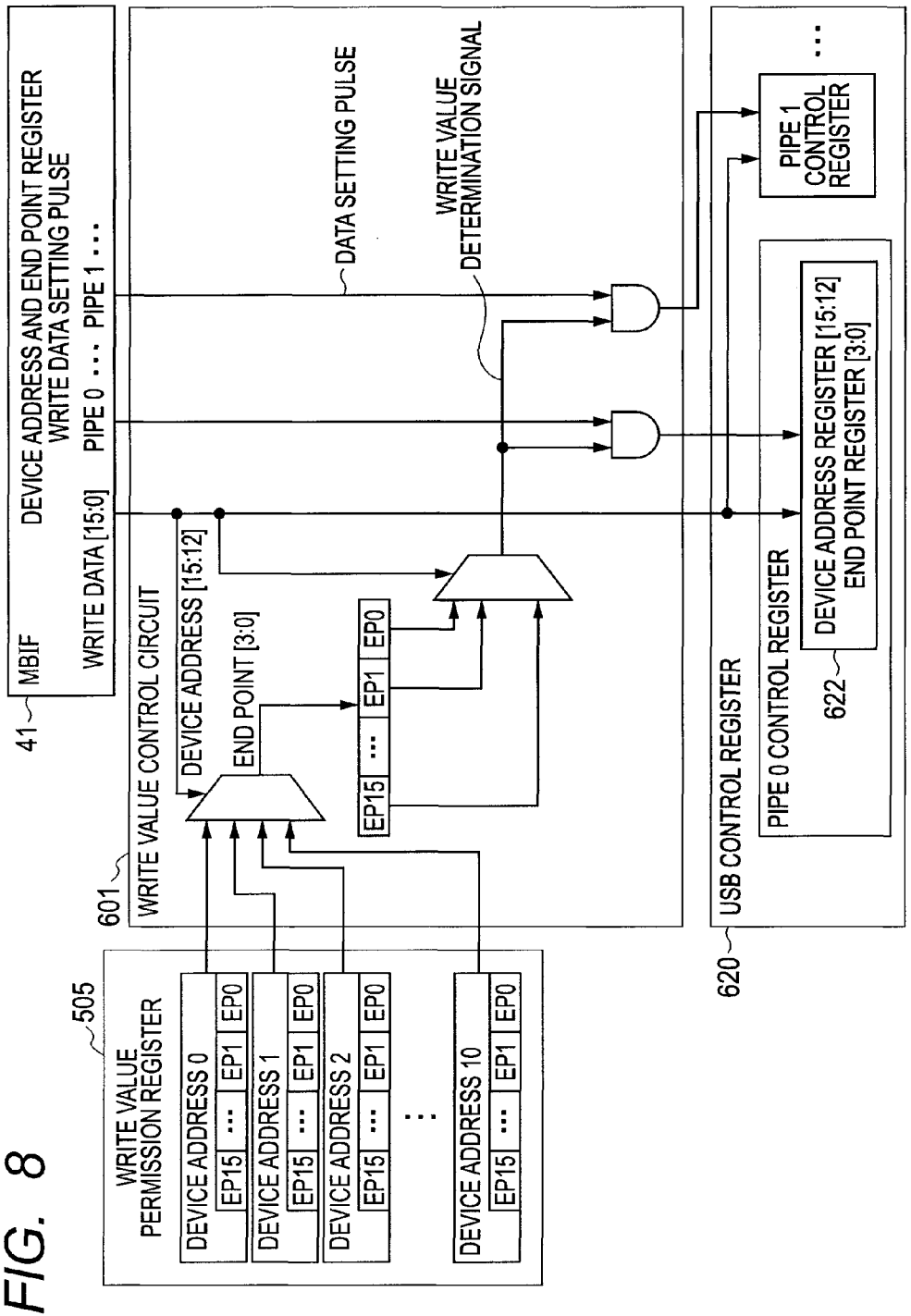
FIG. 8 is a block diagram illustrating a configuration of a write value control circuit by a write value permission register.

FIG. 8 shows a specific example of write value control by the write value control circuit 601 in accordance with the write value permission register 505. When a device address and an end point are supplied from the master bus interface 41, a data setting pulse that indicates which pipe the data pertains to is also supplied. The write value permission register 505 specifies an end point available for each device address. When the entry of an end point corresponding to a device address [15:12] is selected, one piece of end point permission data is selected at an end point [3:0] from the selected entry of end point, the selected permission data is indicative of permission, and a corresponding data setting pulse is enabled, write data [15:0] is written to the pipe control register of the pipe corresponding to the setting pulse at an enabled level and the device address and the end point number are set to the pipe control register.

Figure 9:
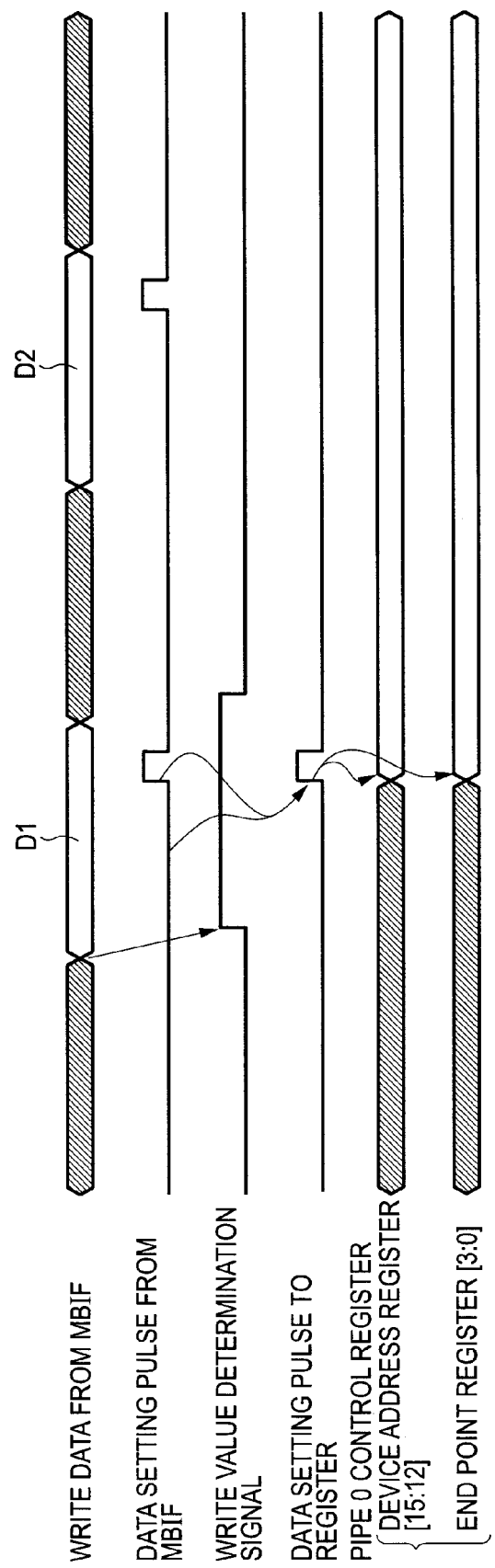
FIG. 9 is a timing chart illustrating an operation timing by a write value control circuit.

FIG. 9 illustrates write operation timing of a device address and an end point number in FIG. 8. In FIG. 9, it is assumed that write data D1 includes a device address and an end point number that are permitted to be written by the write permission register and data D2 does not. Only when a device address and an end point number are included, the setting pulse to the pipe control register is enabled and in synchronization with this, the device address and the end point number are written to the pipe control register.

<<Interrupt Request Function>>

Figure 10:
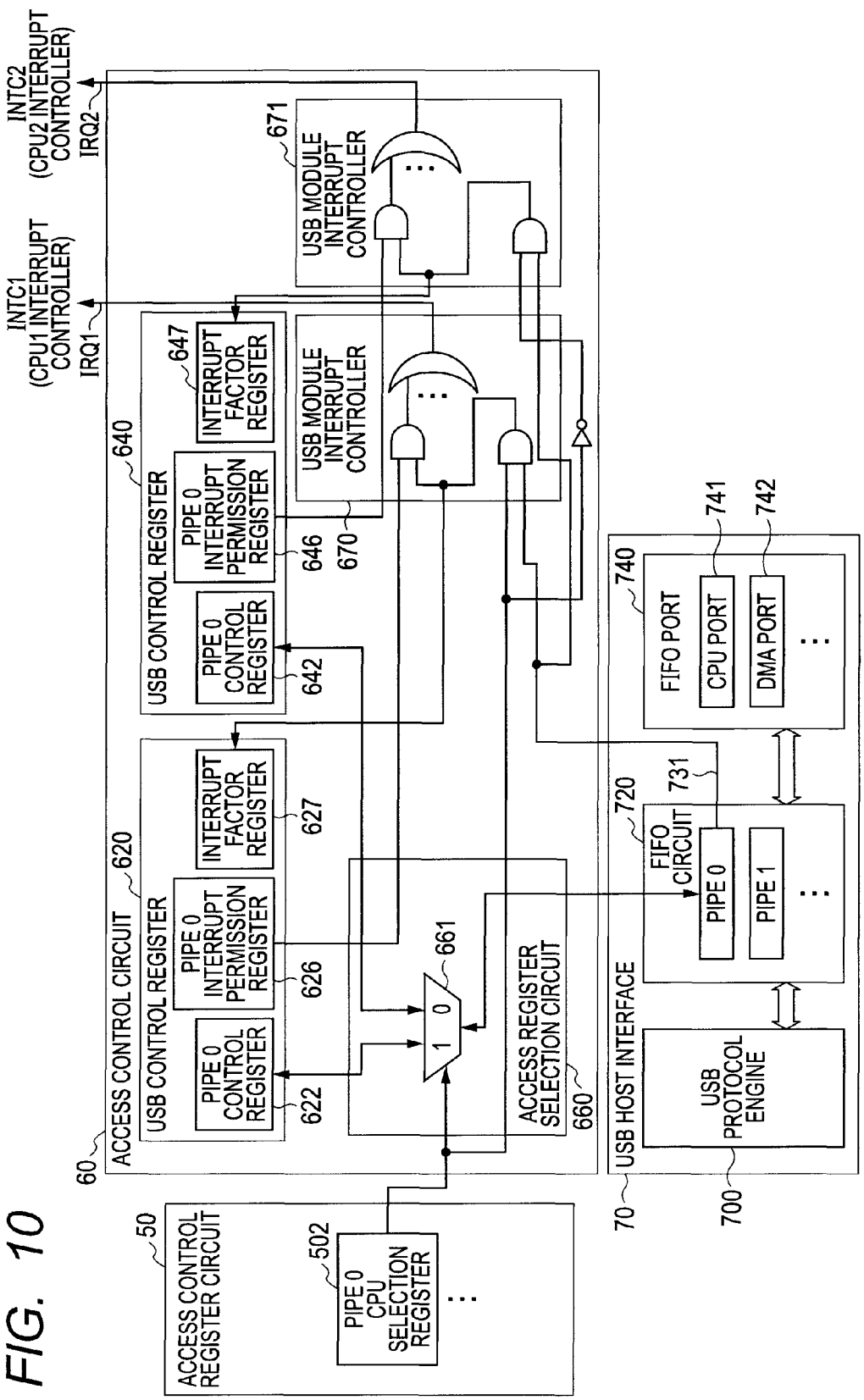
FIG. 10 is a block diagram illustrating a configuration to select a CPU to which an interrupt request is issued.

As illustrated in FIG. 10, the access control circuit 60 includes an interrupt request control function to supply an interrupt request from, for example, the pipe 0 (PIPE0) to the CPU 10 or 20 specified by the pipe 0 CPU selection register 502. Specifically, the USB control register 620 has a pipe 0 interrupt permission register 626 and an interrupt factor register 627, and the USB control register 640 has a pipe 0 interrupt permission register 646 and an interrupt factor register 647, and the access register selection circuit 660 has USB module interrupt controllers 670 and 671. When an interrupt from the pipe 0 is permitted by the pipe 0 interrupt permission register 626 and the access right of the CPU 10 is validated by the pipe 0 CPU selection register 502, an interrupt request signal 731 of the pipe 0 is enabled and thus an interrupt request signal IRQ1 is output to the interrupt controller 11, and thereby, it is possible for the CPU 10 to reply to the interrupt request issued by the pipe 0 that the CPU 10 itself has the right to access. On the other hand, when an interrupt from the pipe 0 is permitted by the pipe 0 interrupt permission register 646 and the access right of the CPU 10 is validated by the pipe 0 CPU selection register 502, the interrupt request signal 731 of the pipe 0 is enabled and thus an interrupt request signal IRQ2 is output to the interrupt controller 21, and thereby, it is possible for the CPU 20 to reply to the interrupt request issued by the pipe 0 that the CPU 20 itself has the right to access. The interrupt factor is grasped by the CPU that has received the interrupt signal by referring to the interrupt factor registers 627 and 647. Although not shown schematically, all of the pipes include the interrupt request control function.

Due to this, it is possible to specify a central processing unit that responds to an interrupt request from a pipe in association with a CPU that has the right to control the pipe.

<<CPU-to-CPU Communication>>

Figure 11:
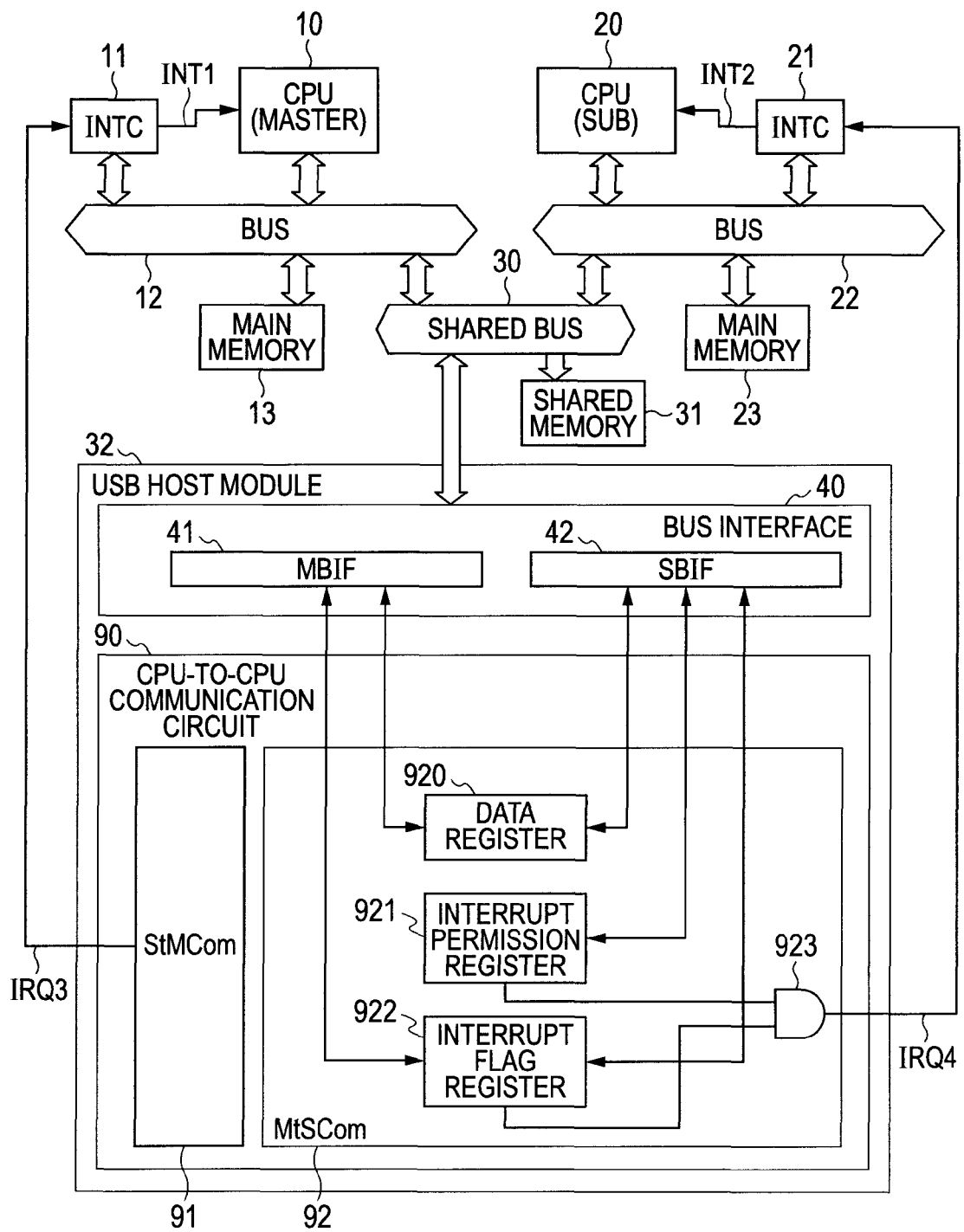
FIG. 11 is a block diagram illustrating a configuration to establish communication between CPUs.

FIG. 11 illustrates a communication circuit for CPU-to-CPU communication. The USB host module 32 has a communication circuit (MtSCom) 92 to establish communication from the CPU 10 to the CPU 20, and a communication circuit (StMCom) 91 to establish communication from the CPU 20 to the CPU 10.

The communication circuit 92 has a data register 920 in which information intended to be communicated is stored in such a manner that the CPU 10 can write and read and which serves as a memory circuit that can be read by the CPU 20, an interrupt permission register 921 used by the CPU 10 intended to establish communication to receive interrupt permission from the CPU 20 of the other party of communication, and an interrupt flag register 922 with which the CPU 10 can set and clear an interrupt flag and the CPU 20 can clear an interrupt flag. When interrupt permission is set to the interrupt permission register 921 by the CPU 20, if the CPU 10 sets an interrupt flag to the interrupt flag register 922, an interrupt request signal IRQ4 is output from a gate circuit 923 to the interrupt controller 21. When the CPU 10 needs to transmit information to the CPU 20, the information to be set to the USB control register 640 by the CPU 20, of the information about a device address and an end point (packet size, transmission/reception direction, protocol) acquired by enumeration, the CPU 10 needs to set an interrupt flag to the register 922 after writing data to be transferred to the data register 920 when an interrupt by the CPU 20 is permitted. Due to this, the CPU 20 can acquire necessary data by accepting the interrupt thereby. When data to be transferred is ready, this is notified to the CPU 20 by an interrupt, and thus, it is possible to reduce the load on the CPU 20 and increase the speed of recognition compared to the case where the CPU 20 recognizes the state using polling.

Although not shown schematically in particular, the communication circuit 91 is configured in the same manner so that when interrupt permission is set to the interrupt permission register by the CPU 10, if the CPU 20 sets an interrupt flag to the interrupt flag register, an interrupt request signal IRQ3 is output from the gate circuit to the interrupt controller 11 and the same effect as that of the communication circuit 92 is exhibited.

<<Operation Flow of USB Host Module>>

Figure 12:
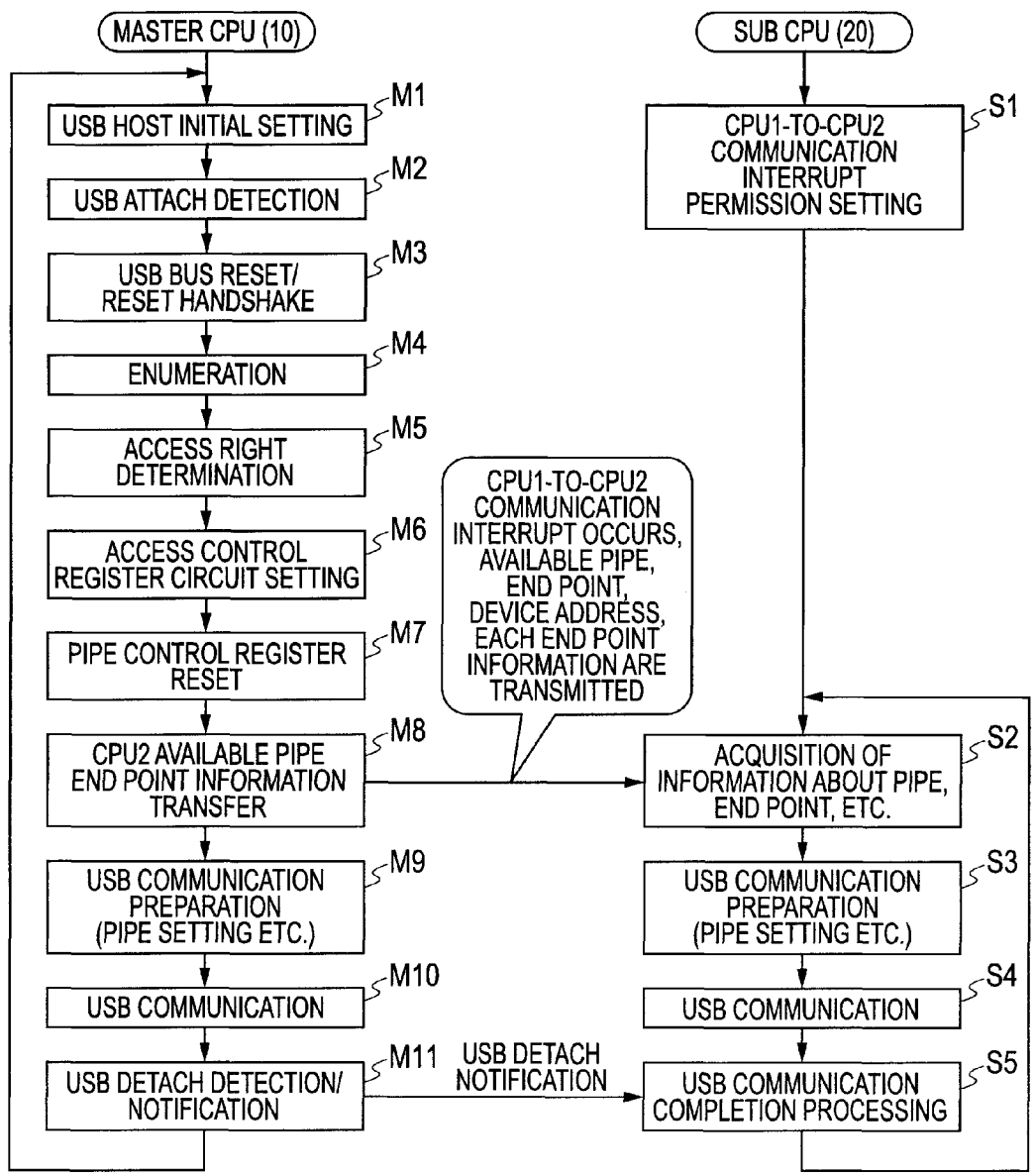
FIG. 12 is a flowchart illustrating an operation of a USB host module 70.

FIG. 12 illustrates an operation flow of the USB host module 70. An initial setting (M1) of the USB host module and attach detection (M2) of the USB device 2 are performed by the master CPU 10. The master CPU 10 that has detected attach of the USB device 2 resets the bus and determines a communication speed by reset handshake (M3). After that, the master CPU 10 performs enumeration with the USB device (M4) and receives the initial setting and device information of the USB device 2. Then, the master CPU 10 determines to which CPU the right to access the end point and pipe should be allocated by making determination based on the information about the USB device (M5) and writes the set value to the access control register circuit 50 (M6). At this time, the master CPU 10 deletes the settings of the device address and the end point already written by resetting the pipe control registers 622, . . . , and 642, . . . (M7). After that, the master CPU 10 transmits the pipe number that is made available, the device address that can be accessed, the end point number, and each end point information to the CPU 20 using the CPU-to-CPU communication function (M8). As the prerequisite for the above, interrupt permission for the communication from the CPU 10 to the CPU 20 is already set to the register 921 by the sub CPU 20 (S1) and the CPU 20 acquires the pipe number that is available, the device address that can be accessed, the end point number, and each end point information from the data register 920 by receiving an interrupt signal INT2 (S2). After that, the master CPU 10 prepares for USB communication, such as a setting of a pipe for the USB control register 620 (M9), and establishes USB communication (M10). When the master CPU 10 detects detach of the USB device, the detach is notified to the CPU (M11). After step S2, the sub CPU 20 prepares USB communication, such as a setting of a pipe for the USB control register 640 (S3), and establishes USB communication (S4). When detach of the USB device is notified from the master CPU 10, the sub CPU 20 ends the USB communication (S5).

<<Guarantee of Confidentiality of Communication Information>>

A specific example of guarantee of confidentiality that can be obtained by using the above-described USB host module will be described. A case where a device as shown in FIG. 5 is coupled and an access control register is set as shown in FIG. 6 is taken as an example. According to this, it is possible for the CPU 10 to transmit and receive subscriber information to and from the end point 0 by controlling the end point 0. It is possible for the CPU 20 to read and write a file and to transmit and receive an Ethernet (registered trademark) frame by receiving information about settings to communicate with the end points 1 to 4 from the CPU 10 and controlling the pipe 1 to pipe 4 based on the information. It is not possible for the CPU 20 to set zero as the endpoint number to the pipe 1 that can be used in order to acquire the subscriber information even if it tries to do so because this setting is invalidated by the write value control circuit 603 in FIG. 4. Further, it is not possible to control the pipe 0, to the end point of which zero is set already, because the CPU 20 cannot access the USB control register 620 and even if the CPU 20 succeeds in accessing the pipe 0 control register 642 of the USB control register 640, it is separated from the pipe 0 (PIPE 0) of the pipe circuit 720 by the access register selection circuit 660 in FIG. 3, and therefore, the CPU 20 cannot control the pipe 0. Furthermore, it is not possible to tap or alter data by coupling the DMA port 742 that can be used to the pipe 0 even if the CPU 20 tries to do so because this setting is invalidated by the write value control circuit 603 in FIG. 4.

When the communication of the pipe 0 is completed and an interrupt of communication completion occurs, even if the sub CPU 20 erroneously permits the interrupt by the pipe 0 interrupt permission register 646, an interrupt request 731 is invalidated within the USB module interrupt controller 671 in FIG. 10 by the setting of the pipe 0 CPU selection register 502.

<<Operation of Time Division Communication in Units of Transaction>>

Figure 13:
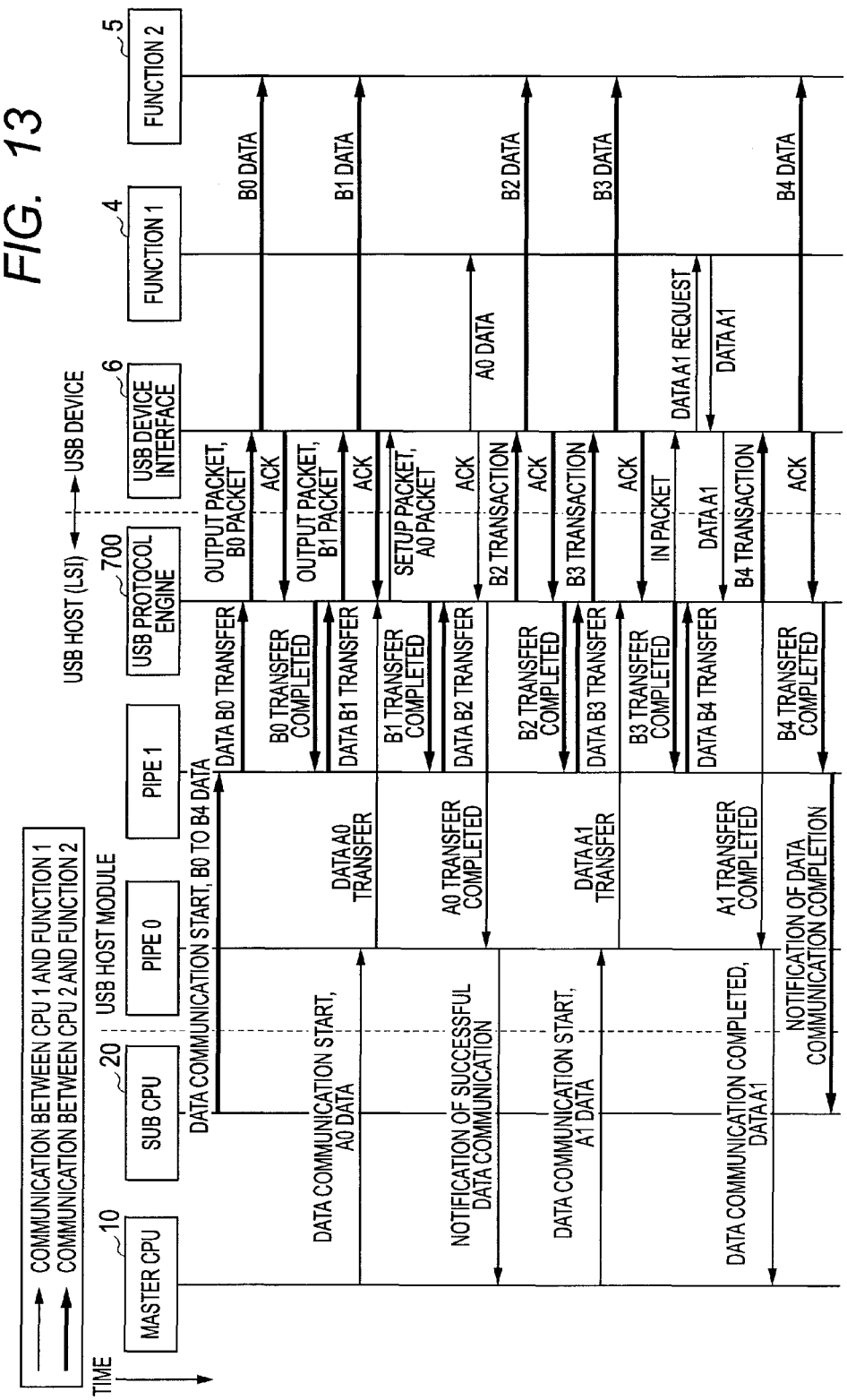
FIG. 13 is a timing chart illustrating a communication operation in which a CPU 10 and a CPU 20 access different pipes simultaneously.
Figure 14:
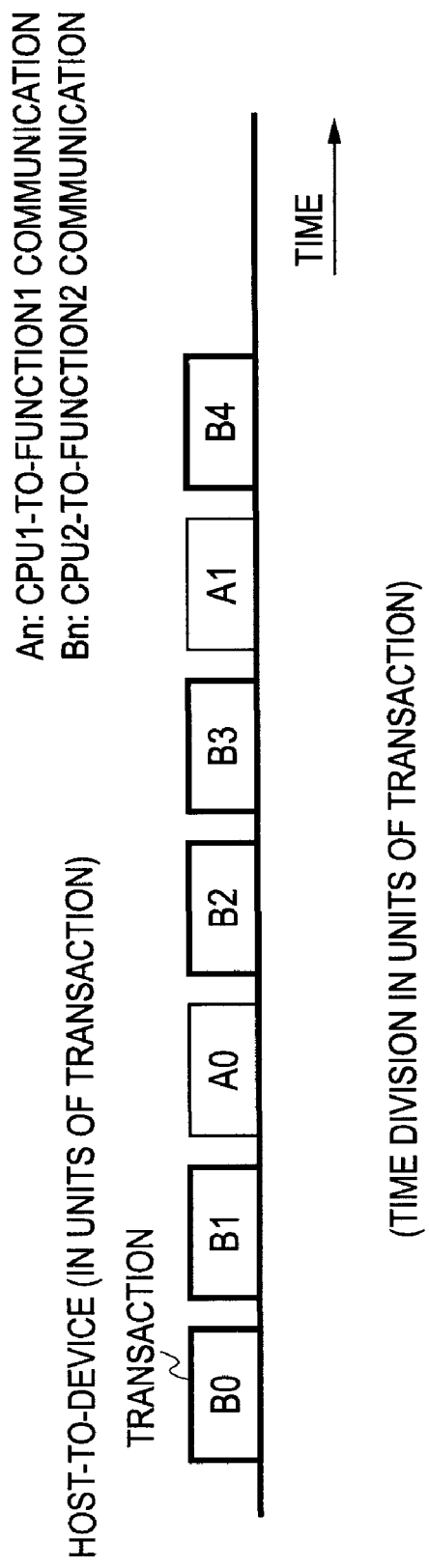
FIG. 14 is a process flow of a transaction to be processed in the operation flow in FIG. 13.
Figure 15:
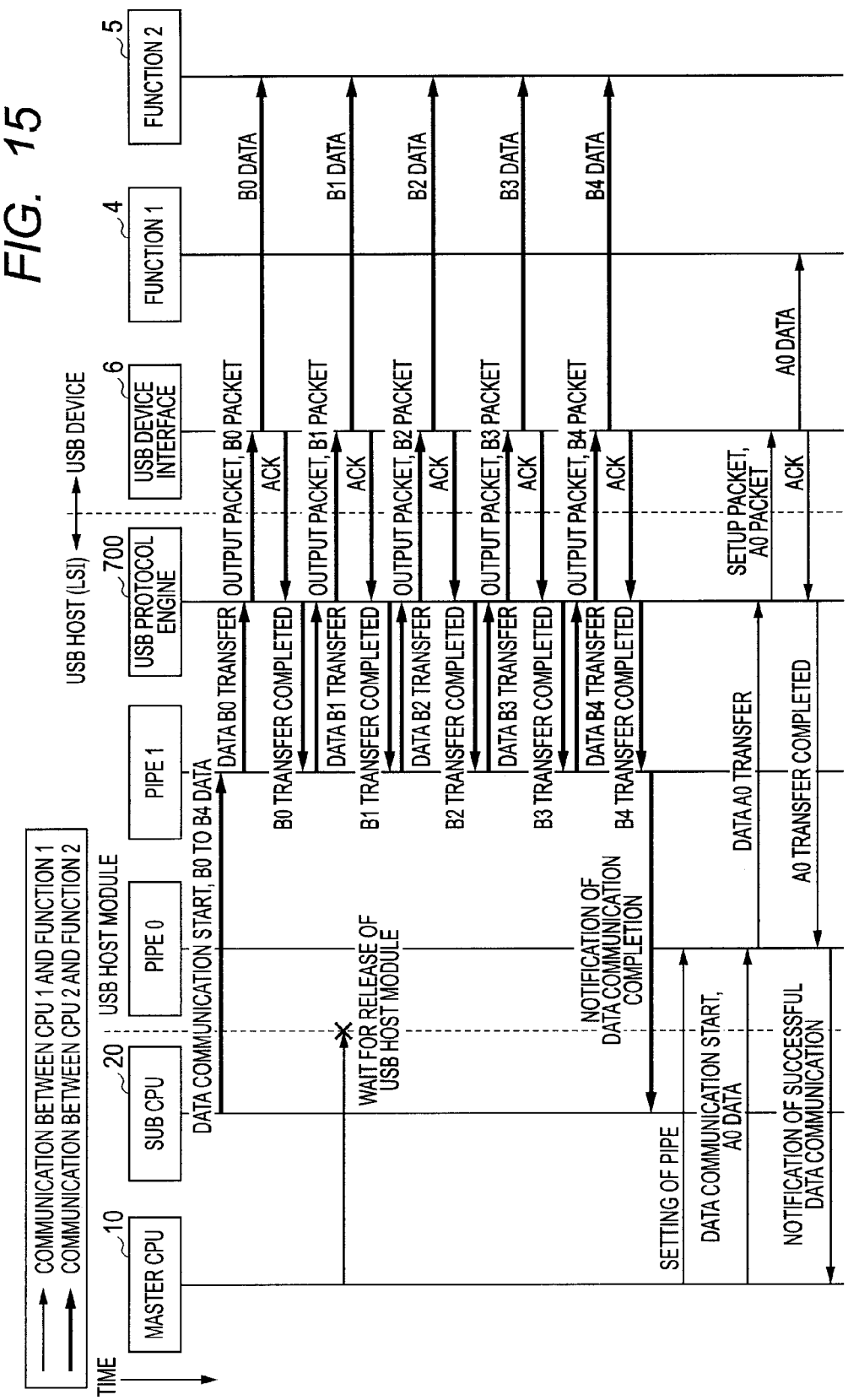
FIG. 15 is a comparative example of FIG. 13 and a timing chart illustrating a communication operation when a CPU performs the right to access a USB module by semaphore management.
Figure 16:
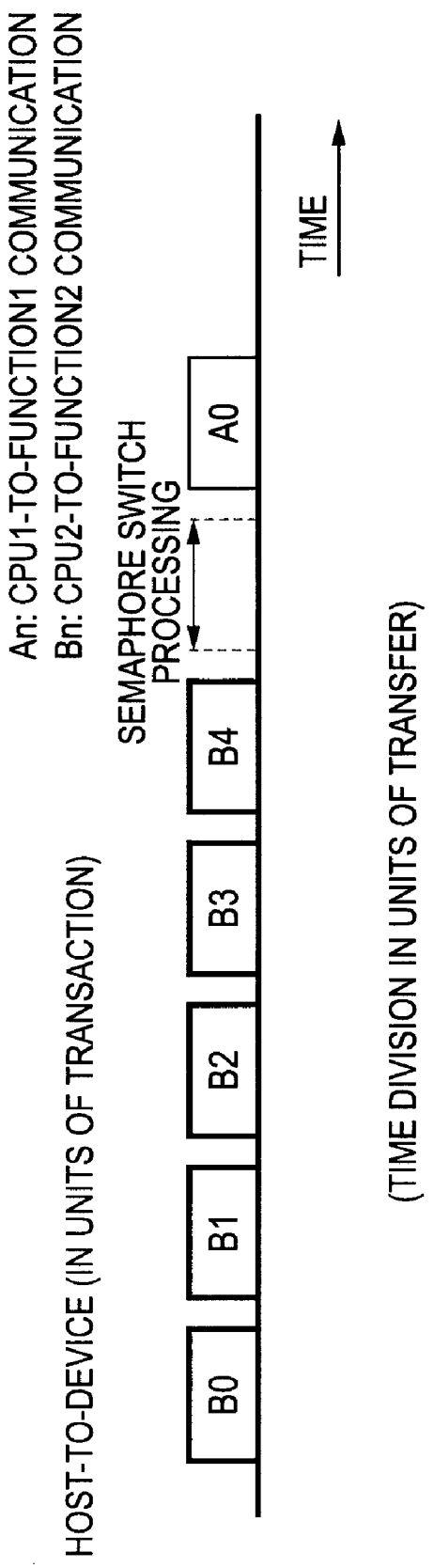
FIG. 16 is a process flow of a transaction to be processed in the operation flow in FIG. 15.

FIG. 13 illustrates an operation of communication of the CPU 10 and CPU 20 that access different pipes at the same time. FIG. 14 shows a process flow of a transaction to be processed by the operation flow in FIG. 13. FIG. 15 is a comparative example of the operation flow in FIG. 13, illustrating an operation of communication when a CPU performs the right to access a USB module by semaphore management and FIG. 16 shows a process flow of a transaction to be processed by the operation flow in FIG. 15.

In FIG. 15, it is necessary for the CPU 1 to wait until the CPU 2 completes the communication because the pipe 0 cannot be used while the USB host module is used by the CPU 2. As illustrated in FIG. 16, after the communication by the CPU 2 is completed, there is a time period before the start of communication because processing, such as processing to manage semaphore, processing to set the pipe of the CPU 1, needs to be performed. Further, it is not possible to correctly perform interrupt transfer or isochronous transfer of the USB. In short, it becomes impossible to guarantee real time processing and a delay time because of processing to switch semaphores etc.

When a file is transferred between the CPU 2 and the function 2, a large amount of data is transferred and the CPU 1 cannot establish communication in the meantime. In FIGS. 13, 14, 15 and 16, B0 to Bn denote blocks of file transfer etc. The CPU 1 performs authentication periodically with the function 1 and if communication with the function 1 cannot be established and a timeout occurs, it becomes impossible to use functions that require authentication. Further, when the CPU 2 communicates with a slow device, it is not possible to put a transaction of the CPU 1 in a period of time between transactions even if it is available. Because of this, the transaction processing efficiency and further, the transfer processing efficiency are reduced considerably, and there is a possibility that necessary transfer cannot be realized.

In contrast to this, by sharing the pipe resource between the two of CPU 10 and CPU 20, it is possible to communicate with a function desired to be communicated alternately in units of transaction without the need to wait for the completion of the transfer of the CPU of the other party as illustrated in FIG. 13. Even when the sub CPU (CPU 2) 20 transmits and receives a large amount of data, it is possible for the master CPU (CPU 1) 10 to communicate with the function 1. The switching of pipes to be used in a time-division manner in units of transaction is controlled by the protocol engine 700 as described above.

<<Second Embodiment>>

Figure 17:
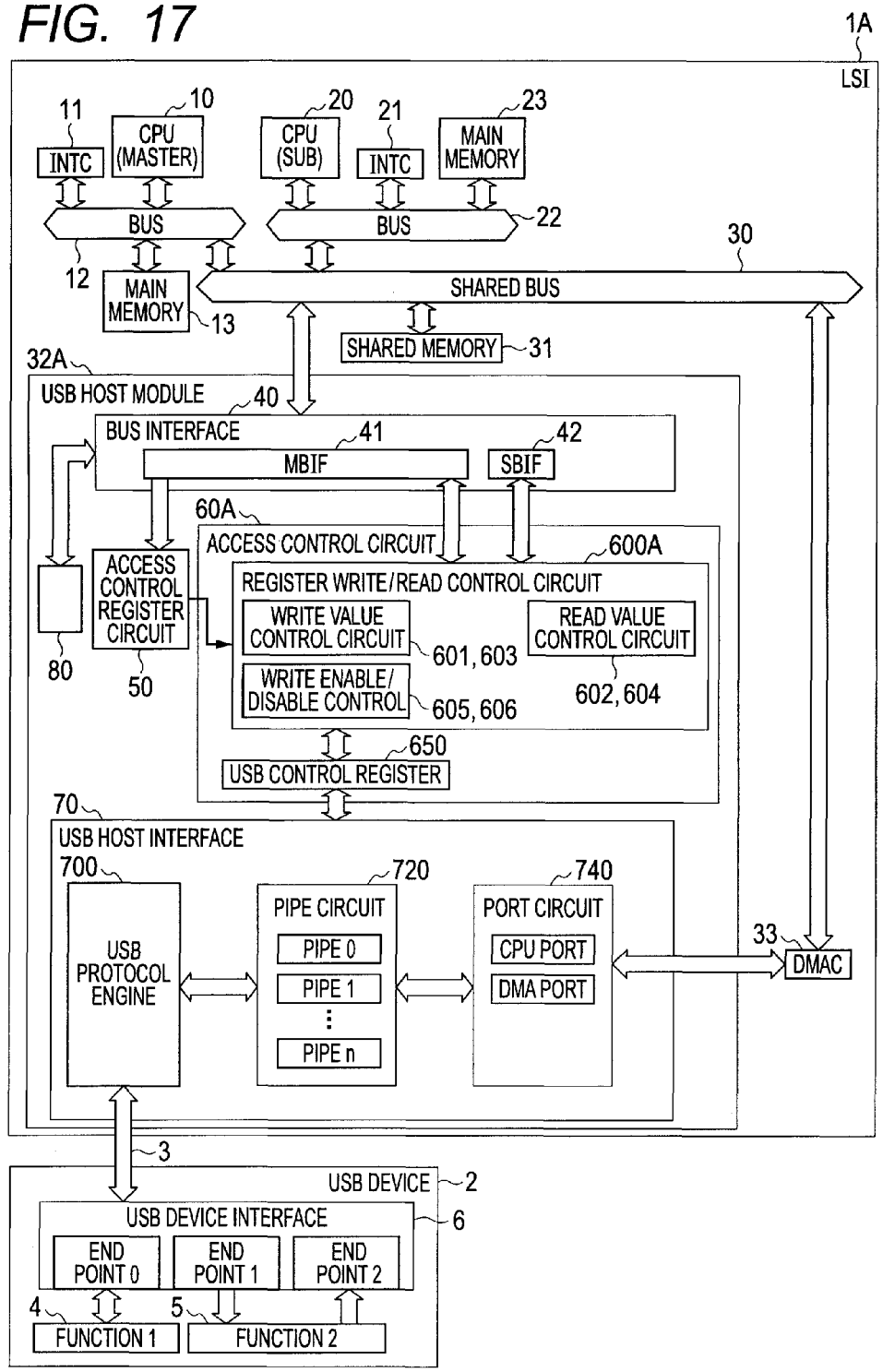
FIG. 17 is a block diagram illustrating a data processing device according to a second embodiment of the present invention.

FIG. 17 shows a data processing device 1A according to a second embodiment of the present invention. The data processing device 1A shown in FIG. 17 differs from that in FIG. 1 in an access control circuit 60A. That is, the data processing device 1A includes one USB control register 650 that stores control data from the CPUs 10 and 20 and information stored in the USB control register 650 is supplied directly to the USB host interface 70. A register write/read control circuit 600A coupled to the USB control register 650 includes write enable/disable control circuits 605 and 606, in addition to the write value control circuits 601 and 603, in order to restrict writing of control data from the CPUs 10 and 20 to the USB control register 650 in accordance with the setting of the access control register circuit. The same reference symbols are attached to the components including the same functions as those in FIG. 1 and their detailed explanation is omitted.

Figure 18:
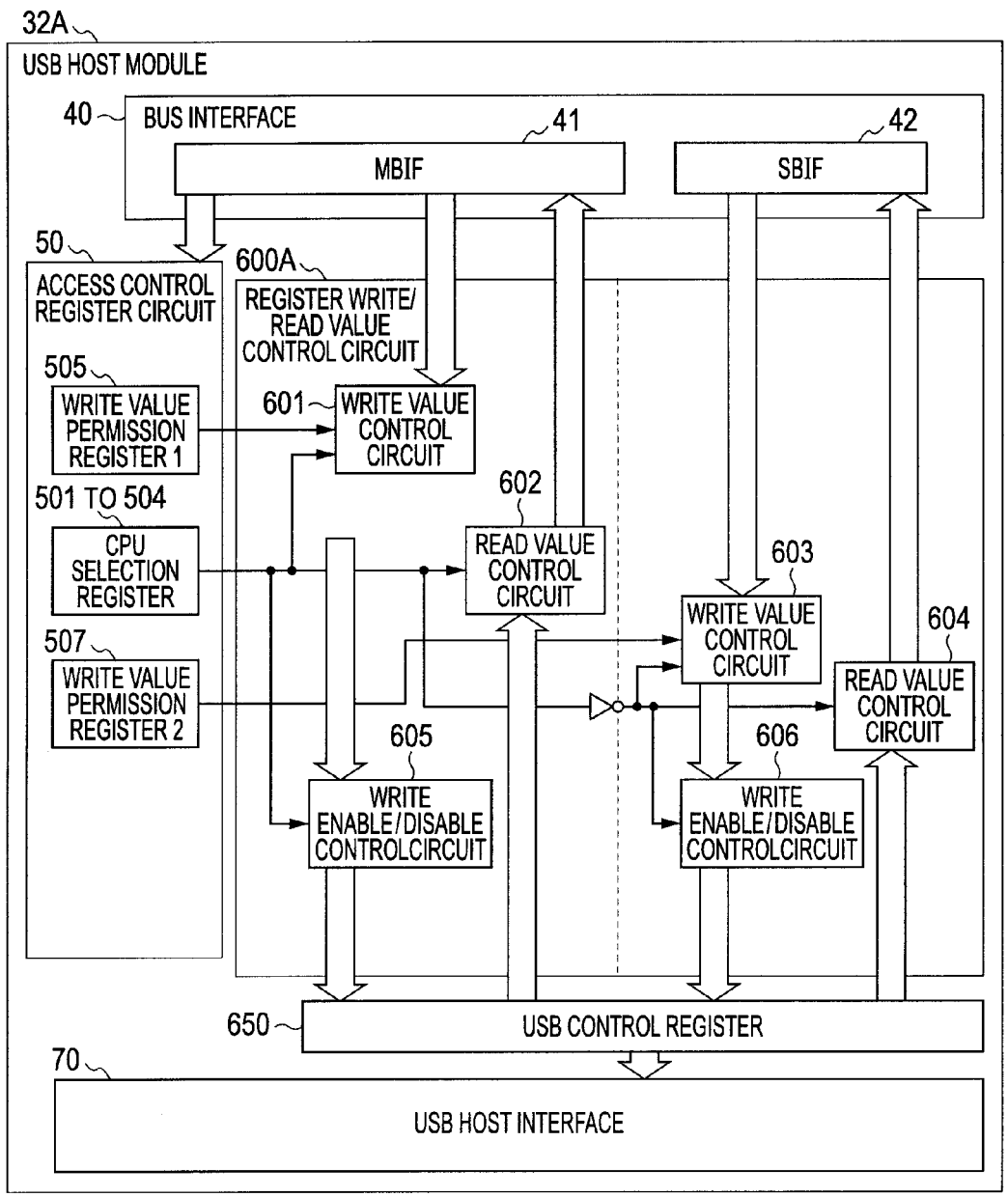
FIG. 18 is a block diagram showing a specific example of a register write/read control circuit 600A.

FIG. 18 shows a specific example of the register write/read control circuit 600A. The write value control circuits 601 and 603 and the read value control circuits 602 and 604 are arranged on the side of the master bus interface 41 and on the side of the sub bus interface 42, respectively, as in FIG. 4. Between the write value control circuit 601 and the USB control register 650, the write enable/disable control circuit 605 that controls to enable or disable the writing from the side of the CPU 10 is arranged and only the data that the access right of the CPU 10 is granted by the CPU selection registers 501 to 504 can be supplied to the corresponding register of the USB control register 650. On the other hand, between the write value control circuit 603 and the USB control register 650, the write enable/disable control circuit 606 that controls to enable or disable the writing from the side of the CPU 20 is arranged and only the data that the access right of the CPU 20 is granted by the CPU selection registers 501 to 504 can be supplied to the corresponding register of the USB control register 650. The restriction of the reading of control data to the CPU having no access right is achieved by the read value control circuits 602 and 604 described above.

Due to this, the same function and effect as those in FIG. 1 can be exhibited and at the same time, it is possible to make the USB control register 650 common to the CPUs 10 and 20.

<<Third Embodiment>>

Figure 19:
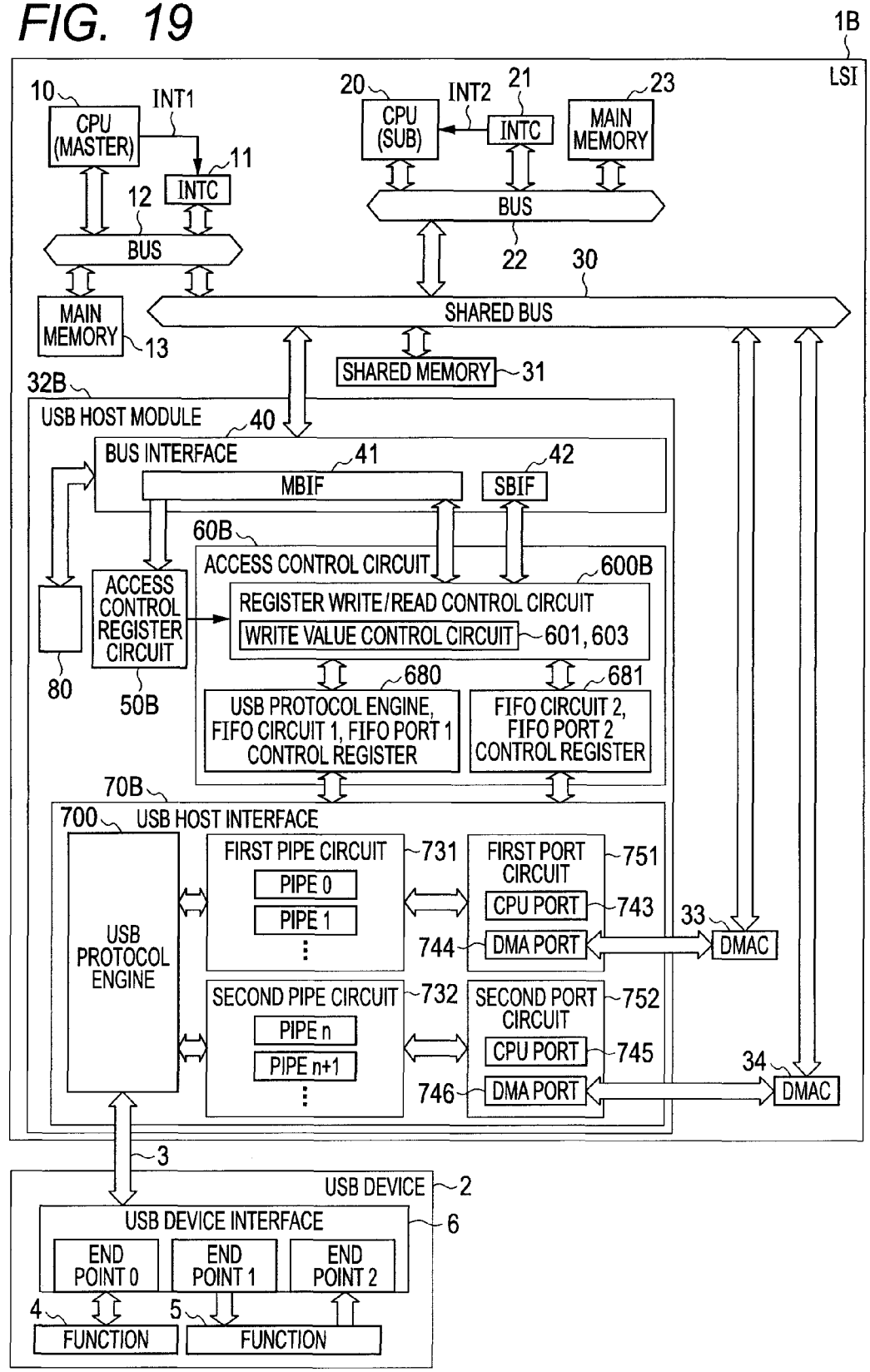
FIG. 19 is a block diagram illustrating a data processing device 1B according to a third embodiment of the present invention.

FIG. 19 shows a data processing device 1B according to a third embodiment of the present invention. The data processing device 1B shown in FIG. 19 differs from that in FIG. 1 in an access control circuit 60B and a USB host interface 70B. That is, in the above-mentioned embodiment, it is possible to freely change the number of pipes that the CPUs 10 and 20 use, and however, here, it is assumed that a predetermined number of pipes are allocated to each of the CPUs 10 and 20 from the first. The same reference symbols are attached to the components including the same functions as those in FIG. 1 and their detailed explanation is omitted.

In more detail, the USB host interface 70B has a first pipe circuit 731 and a first port circuit 751 to be allocated to the CPU 10, and a second pipe circuit 732 and a second port circuit 752 to be allocated to the CPU 20. Although not shown schematically in particular, a CPU port 743 is coupled to the master bus interface 41 and a CPU port 745 is coupled to the sub bus interface 742. A DMA port 744 is coupled to the DMA controller 33 and a DMA port 746 is coupled to another DMA controller 34. The DMA controller 33 is granted the exclusive control right by the CPU 10 and the DMA controller 34 is granted the exclusive control right by the CPU 20.

The access control circuit 60B includes a register write/read control circuit 600B, a USB control register 680 that the CPU 10 has the exclusive right to access, and a USB control register 681 that the CPU 20 has the exclusive right to access. The register write/read control circuit 600B includes the write value control circuit 601 that restricts values to be written to the USB control register 680 and the write value control circuit 603 that restricts values to be written to the USB control register 681 in accordance with the set values of the write value permission registers 505 and 507 within an access control register circuit 50B.

The USB control register 680 has a protocol engine control register like the register 621, a port control register like the register 622, a CPU port control register like the register 623, and a DMA port control register like the register 624. The set values of these registers are supplied to the first pipe circuit 731 and the first port circuit 751 as they are. The USB control register 681 has a port control register like the register 622, a CPU port control register like the register 623, and a DMA port control register like the register 624. The set values of these registers are supplied to the second pipe circuit 732 and the second port circuit 752 as they are.

The access control register 50B does not need to have the CPU selection registers 501 to 504.

According to the present embodiment, it is possible to obtain the same effect as that in FIG. 1 even after individualizing the pipe circuit and the port circuit for each CPU.

<<Fourth Embodiment>>

Figure 20:
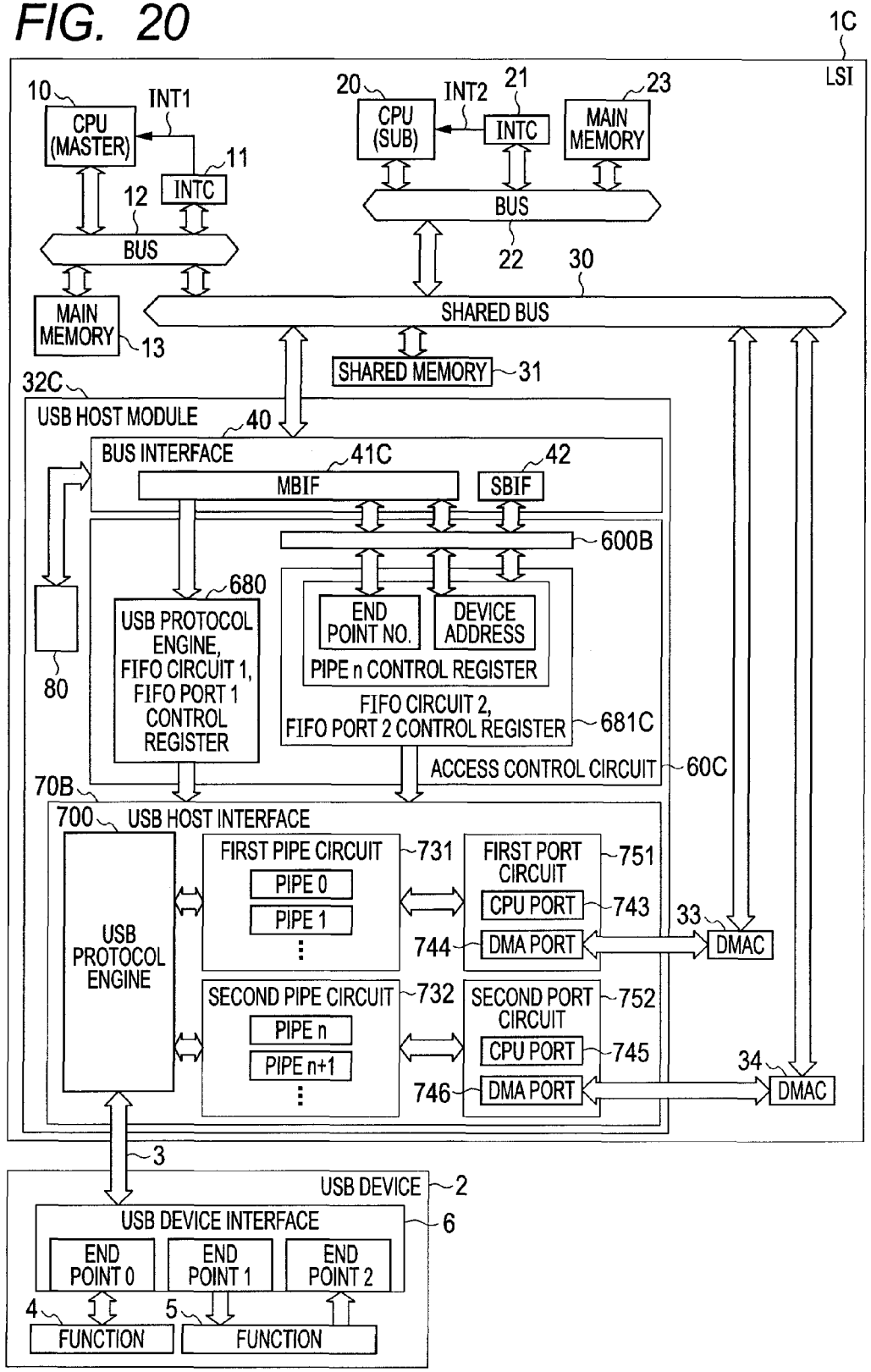
FIG. 20 is a block diagram illustrating a data processing device 1C according to a fourth embodiment of the present invention.

FIG. 20 shows a data processing device 1C according to a fourth embodiment of the present invention. The data processing device 1C shown in FIG. 20 is an example, in which a case where a plurality of USB devices is coupled via a USB hub etc. is supposed, and its configuration is regarded as one, for example, in which the data processing device 1B in FIG. 19 is improved. A point of difference from that in FIG. 19 is the configuration of a USB control register 681C and a master bus interface 41C. That is, the configuration is such that the pipe control register of the USB control register 681C on the side of the CPU 20 can also be manipulated by the CPU 10. The same reference symbols are attached to the components including the same functions as those in FIG. 19 and their detailed explanation is omitted.

A more detailed explanation is given. As described above, here, a case is supposed where the USB devices are coupled to the USB protocol engine 70B via a USB hub etc. When two or more USB devices are coupled and they are inserted and removed repeatedly, a function is needed to delete settings of the device address and the end point so that no settings are left to the pipe. For example, it is assumed that the device address 5 is allocated to the CPU 20 in the configuration in FIG. 19. Because access by the CPU 20 is permitted, it is possible to set the device address 5 to the control register 681 of the pipe. Even after the USB device is removed, its setting remains. After that, if another USB device is coupled, access to the device is permitted only to the CPU 10, and the device address 5 is allocated thereto, the device address 5 is set to the pipe on the side of the CPU 20, and hence, it is also possible for the CPU 20 to communicate with the USB device of the device address 5, resulting in a problem of security. Under the condition that only one USB device can be coupled, it is only required to employ a control procedure to reset the pipe when the one USB device is removed, however, when two or more USB devices can be coupled, even if one USB device is separated, there is a possibility that the pipe is in communication with another device address, and thus, it is not possible to clear the pipe.

Because of the above, in FIG. 20, it is also made possible for the CPU 10 to access the pipe control register that sets a device address and an end point in the USB control register 681C on the side of the CPU 20. When the USB device is inserted and removed repeatedly and the device address previously used is used again, the CPU 10 confirms whether the value set previously remains in the pipe control register. When the previously set value remains, the CPU 10 allocates a different address or instructs the CPU 20 to rewrite the register and uses the device address after confirming that the value is rewritten.

<<Fifth Embodiment>>

Figure 21:
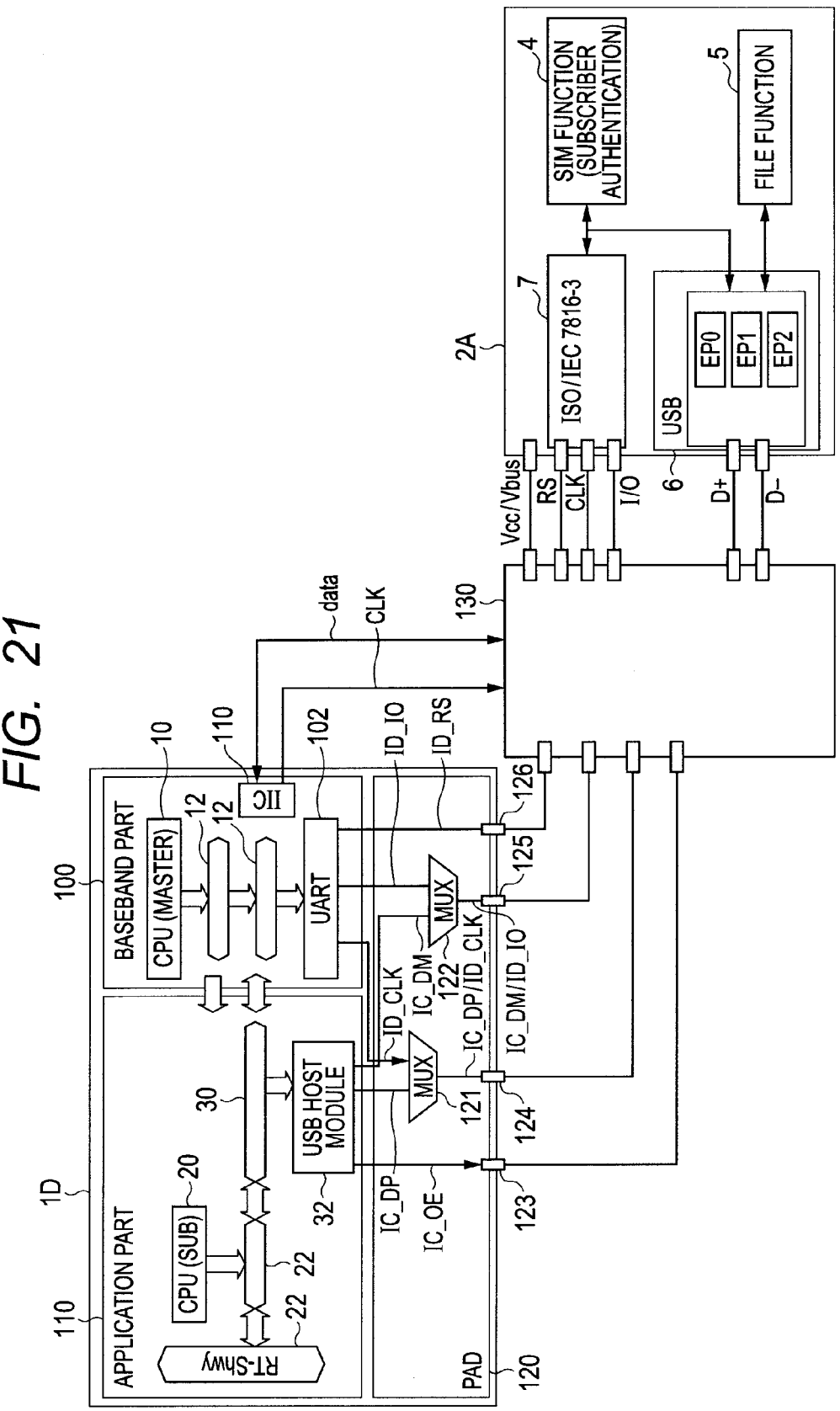
FIG. 21 is a block diagram illustrating a data processing device 1D to accept a UIM device including a UART interface in addition to a USB interface or a UIM device including only a UART interface.

FIG. 21 illustrates a data processing device 1D to accept a UIM (User Identity Module) device including a UART (Universal Asynchronous Receiver Transmitter) interface in addition to a USB interface, or a UIM device including only a UART interface. A UIM device is widely used for authentication of a user of a mobile terminal, typified by a mobile phone and a UART interface is used conventionally, which performs general-purpose asynchronous transmission/reception, however, it is also possible to employ a USB interface having a higher communication speed compared to a UART interface. Here, the data processing device 1D is described, which accepts any one of a UIM device in which a USB interface and a UART interface are mounted mixedly in a transitional stage, a UIM device in which only a USB interface is mounted, and a UIM device in which only a UART interface is mounted.

For example, the data processing device 1D includes all of the functions described in the first embodiment, and in which the CPU 20 that will serve as a sub and the USB host module 32 are arranged in an application part 110, and the CPU 10 that will serve as a master, a UART interface module 102, and an IIC (Inter-Integrated Circuit) interface module 101 are arranged in a base band part 100. The IIC interface is an interface that easily establishes bidirectional serial communication between master and slave using two signal lines of data and clock. The UART interface is an interface scheme to convert asynchronous serial transfer and parallel transfer mutually.

Although not limited in particular, the USB host module 32 outputs an enable signal IC_OE and inputs and outputs a non-inverted signal IC_DP and an inverted signal IC_DM. Although not limited in particular, the UART interface module 102 outputs a clock signal ID_CLK and a reset signal ID_RS and inputs and outputs a data signal ID_IO. As external interface terminals of these signals, an output terminal 123 of the enable signal IC_OE, a shared terminal 124 of the non-inverted signal IC_DP and the clock signal ID_CLK, a shared terminal 125 of the inverted signal IC_DM and the data signal ID_IO, and an output terminal 126 of the reset signal ID_RS are provided. A multiplexer 121 selects either of the non-inverted signal IC_DP and the clock signal ID_CLK. A multiplexer 122 selects either of the inverted signal IC_DM and the data signal ID_IO. Reference numeral 120 generally refers to an input/output pad region (PAD) in which external terminals and input/output buffers are arranged in a semiconductor integrated circuit. The IIC interface module 101 outputs a clock signal CLK and inputs and outputs data (data). Although not shown schematically in particular, it is of course that the IIC interface module 101 also inputs and outputs the clock signal CLK and data (data) from and to outside via the input/output pad region (PAD).

An external device 2A is coupled to the data processing device 1D via a power supply control semiconductor device 130 as a device control device. The external device 2A includes a UART device interface 7 in addition to the USB device interface 6 and the functions 4 and 5. The UART device interface 7 conforms to, for example, ISO/IEC 7816-3 and is coupled to the function 4. For example, the function 4 is supposed to be a storage, such as a SIM, and the function 5, as a flash memory card. Vcc refers to an operating power supply of the UART device interface 7 and Vbus refers to an operating power supply of the USB device interface 6. RS refers to a reset signal, CLK refers to a clock signal, and I/O refers to input/output data, which are coupled to the UART device interface 7. D+ refers to non-inverted data and D− refers to inverted data, which are coupled to the USB device interface 6. The operating power supply for the power supply control semiconductor device 130 and the activation of terminal are controlled by the CPU 110 via the IIC interface module 101.

Figure 22:
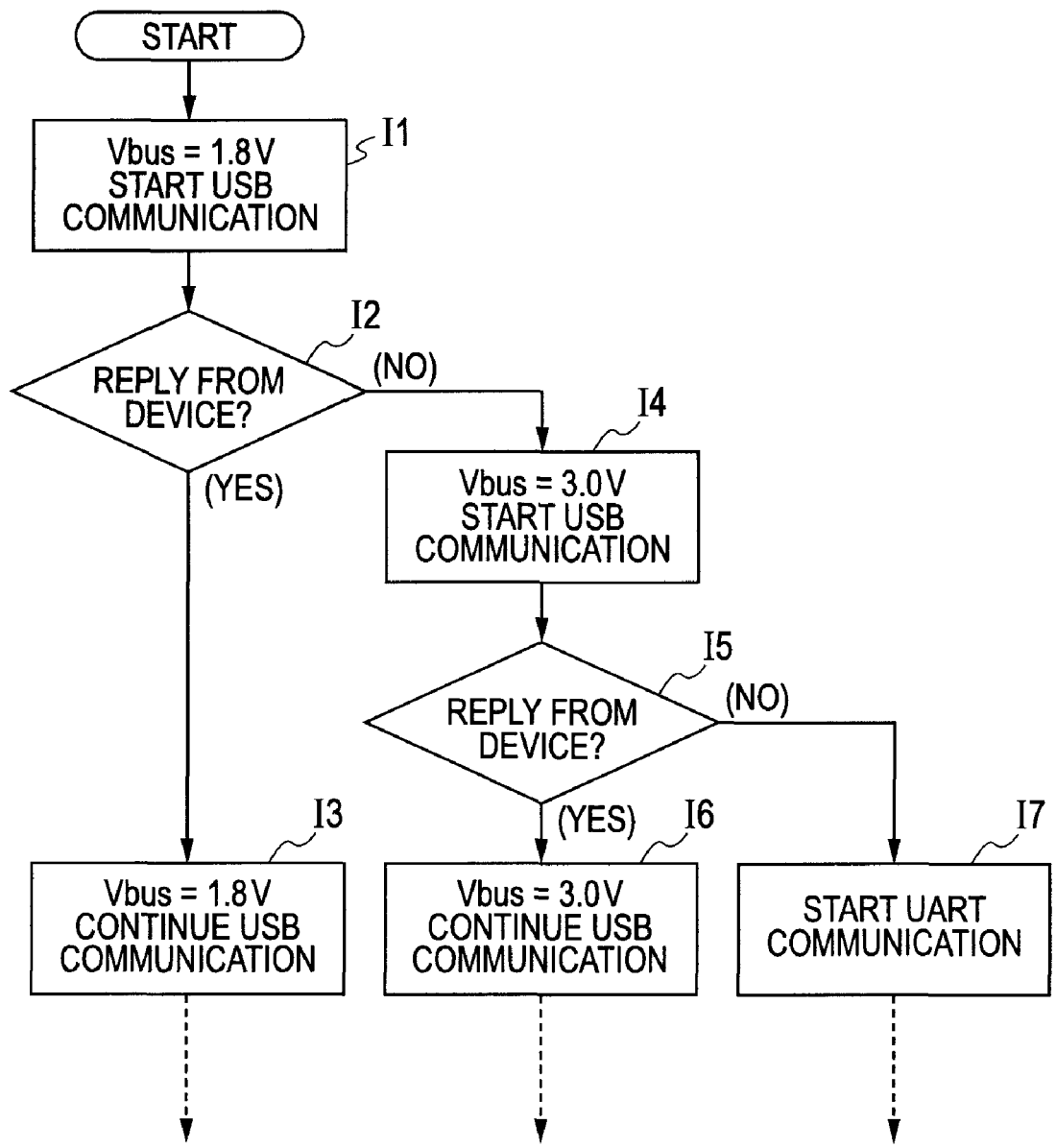
FIG. 22 is a flowchart showing a control operation to determine an interface mode with an external device by a power supply control semiconductor device 130.

Control to determine an interface mode with an external device by the power supply control semiconductor device 130 is described. The external device 2A is supposed to support both UART (ISO/IEC 7816-3), which is a main scheme at present, and USB supported by the data processing device 1D. The power supply of the physical communication path of the USB device interface 6 is divided into, for example, five classes and it is necessary to support both 1.8 V and 3.0 V. Consequently, it becomes necessary to determine which power supply and which interface the coupled external device supports. For example, the CPU 10 controls to determine which interface can be used by establishing communication by the USB interface at 1.8 V (I1), determining whether or not there is a response (I2), and continuing the communication by the USB interface at 1.8 V when receiving the response (I3), as illustrated in FIG. 22. When receiving no response, the CPU 10 changes the operating power supply to 3.0 V and makes an attempt to establish communication by the USB interface again (I4) and determines whether or not there is a response (I5). When there is a response, the CPU 10 continues the communication by the USB interface at 3.0 V (I6) and if communication cannot be established still, the CPU 10 determines that the USB interface cannot be used and attempts communication by the UART interface (I7). The above-mentioned operating power supplies are switched using the IIC interface module 101.

Because of the above, it is possible to accept an external device including a plurality of kinds of USB interface having different power supply voltages and further an external device supporting only a UART interface.

According to the respective embodiments described above, the following functions and effects are exhibited.

[1] It is possible for a plurality of CPUs to share one USB host module and establish communication in a time-division manner by allocating different pipes, respectively, to the two of CPU 10 and CPU 20 and further, having a function capable of transmitting/receiving information necessary for communication with an end point between the CPUs.

[2] CPU communication can be established by utilizing an interrupt between the CPU 10 and the CPU 20, and hence, it is possible to quickly transmit the result of the enumeration performed by the master CPU 10 to the sub CPU 20.

[3] A CPU is restricted from writing control information, such as specification of a device address and an end point number for a pipe that the CPU does not have the right to access, and hence, it is possible to prevent another CPU from obstructing, tapping, and altering communication and to contribute to perfect safety for confidential information.

[4] An interrupt that occurs in a pipe is notified only to a CPU having the right to control the pipe, and hence, it is possible to avoid a state where wasteful interrupt processing occurs in another CPU.

The invention made by the inventors of the present invention is explained specifically based on the embodiments, however, the present invention is not limited to those, and it is needless to say that there can be various modifications in the scope not, deviating from its gist.

For example, the number of CPUs that share one USB host module is not limited to two but may be three or more. The present invention is not limited to the case where the present invention is applied to a communication mobile terminal typified by a mobile phone but can be applied widely to various electronic devices including a USB interface. The data processing device according to the present invention is not limited to a single chip semiconductor device and it is also possible to configure the data processing device as a module device that mounts multiple chips in one package. Further, it is also possible to configure the data processing device 1D and the power supply control semiconductor device 130 as a single chip.

What is claimed is:

1. A data processing device having a plurality of central processing units and a USB host module coupled to the central processing units,
   wherein the USB host module has:
      a USB host interface to which a USB device is coupled from the outside of the data processing device;
      a bus interface coupled to the central processing units;
      an access control register circuit coupled to the bus interface and accessed by a specific central processing unit; and
      an access control circuit that controls the USB host interface in accordance with the content set to the access control register circuit,
   wherein the USB host interface has:
      a pipe circuit having a plurality of pipes to communicate with an arbitrary end point of the USB device coupled from the outside of the data processing device; and
      a USB host protocol engine that processes a transaction transfer request from the pipe,
   wherein the access control register circuit has a first access control register that specifies which central processing unit should have a right to control the pipe, and
   wherein the access control circuit conveys only the control information from the central processing unit having an access right for each pipe in accordance with the setting of the first access control register to the pipe.

2. The data processing device according to claim 1,
   wherein the access control register circuit has a second access control register that specifies which central processing unit should have a right to control the USB host protocol engine, and
   wherein the access control circuit conveys only the control information from the central processing unit specified by the second access control register to the USB host protocol engine.

3. The data processing device according to claim 2,
   wherein the USB host interface has a CPU port to perform input and output of a transaction with the central processing unit for the pipe of the pipe circuit,
   wherein the access control register circuit has a third access control register that specifies which central processing unit should have a right to control the CPU port, and
   wherein the CPU port performs input and output of a transaction with a CPU having the control right granted by the third access control register.

4. The data processing device according to claim 2, having a DMA controller,
   wherein the USB host interface has a DMA port that performs input and output of a transaction with the DMA controller for the pipe of the pipe circuit, wherein the access control register circuit has a fourth access control register that specifies which central processing unit should have a right to control the DMA port, and wherein the DMA port performs input and output of a transaction in accordance with data transfer control under the transfer condition set to the DMA controller by the CPU having the control right granted by the fourth access control register.

5. The data processing device according to claim 3,
wherein the access control register circuit has a fifth access control register that specifies a function allocatable to the pipe for each pipe, and wherein the access control circuit restricts the control information to be conveyed to the pipe to a range set to the fifth access control register.

6. The data processing device according to claim 5,
wherein the control information to be conveyed to the pipe includes an end point number and a device address.

7. The data processing device according to claim 6,
wherein the access control circuit includes a USB control register to store control data from the central processing unit for each central processing unit and has a write value control circuit that restricts writing of the control data from the central processing unit to the USB control register in accordance with the content of the fifth access control register.

8. The data processing device according to claim 7,
wherein the access control circuit has an access register selection circuit coupled to the USB control register, and wherein the access register selection circuit selects the content of the USB control register corresponding to the central processing unit specified by the first control register to the fourth control register and gives the content to the USB host interface circuit.

9. The data processing device according to claim 6,
wherein the access control circuit includes a USB control register to store control data from the central processing unit and has a write value control circuit that restricts writing of the control data from the central processing unit to the USB control register in accordance with the content of the fifth access control register.

10. The data processing device according to claim 9,
wherein the access control circuit has a write enable/disable control circuit coupled to the USB control register, and wherein the write enable/disable control circuit refuses the writing to the USB control register by a central processing unit other than the central processing unit specified by the first control register to the fourth control register.

11. The data processing device according to claim 1,
wherein the access control circuit has an interrupt request control circuit that supplies an interrupt request from each pipe to the central processing unit specified by the first control register.

12. The data processing device according to claim 1, having a communication circuit to establish mutual communication between one central processing unit and another of the central processing units, wherein the communication circuit has a memory circuit in which information intended to be communicated is stored in such a manner that the information can be written and read by the central processing unit, and wherein the central processing unit that intends to establish communication makes an interrupt request to a central processing unit of the other party of communication by setting a communication flag upon receipt of an interrupt permission from the central processing unit of the other party of communication.

13. The data processing device according to claim 4,
wherein the access control register circuit has a fifth access control register that specifies a function allocatable to the pipe for each pipe, and wherein the access control circuit restricts the control information to be conveyed to the pipe to a range set to the fifth access control register.

14. The data processing device according to claim 13,
wherein the control information to be conveyed to the pipe includes an end point number and a device address.

15. The data processing device according to claim 14,
wherein the access control circuit includes a USB control register to store control data from the central processing unit for each central processing unit and has a write value control circuit that restricts writing of the control data from the central processing unit to the USB control register in accordance with the content of the fifth access control register.

16. The data processing device according to claim 15,
wherein the access control circuit has an access register selection circuit coupled to the USB control register, and wherein the access register selection circuit selects the content of the USB control register corresponding to the central processing unit specified by the first control register to the fourth control register and gives the content to the USB host interface circuit.

17. The data processing device according to claim 14,
wherein the access control circuit includes a USB control register to store control data from the central processing unit and has a write value control circuit that restricts writing of the control data from the central processing unit to the USB control register in accordance with the content of the fifth access control register.

18. The data processing device according to claim 17,
wherein the access control circuit has a write enable/disable control circuit coupled to the USB control register, and wherein the write enable/disable control circuit refuses the writing to the USB control register by a central processing unit other than the central processing unit specified by the first control register to the fourth control register.

19. A data processing device having a plurality of central processing units and a USB host module coupled to the central processing units, wherein the USB host module has:
a USB host interface to which a USB device is coupled from the outside of the data processing device;
a bus interface coupled to the central processing units;
an access control register circuit coupled to the bus interface and accessed by a specific central processing unit; and
an access control circuit that controls the USB host interface in accordance with the content set to the access control register circuit, wherein the USB host interface has:
a pipe circuit having a plurality of pipes to communicate with an end point of a USB device coupled from the outside of the data processing device, the pipe circuit being individualized for each of the central processing units;
a CPU port that performs input and output of a transaction between the pipe circuit and the central processing unit, the CPU port being individualized for each of the central processing units; and a USB host protocol engine that processes a transaction transfer request from the pipe, wherein the access control register circuit specifies a function allocatable to the pipe for each pipe, and wherein the access control circuit has a USB control register to which information to control the USB host interface is set after being individualized for each central processing unit and the access control circuit restricts the control information to be set to the USB control register to a range set to the access control register.

20. The data processing device according to claim 19, wherein the control information to be conveyed to the pipe includes an end point number and a device address.

21. The data processing device according to claim 20, wherein only the USB control register corresponding to the specific central processing unit can store the control information to be conveyed to the USB host protocol engine.

22. The data processing device according to claim 21, having a DMA controller, wherein the USB host interface has a DMA port that performs input and output of a transaction with the DMA controller for the pipe of the pipe circuit, the DMA port being individualized for each of the central processing units, and wherein the DMA port performs input and output of a transaction in accordance with data transfer control under the transfer condition set to the DMA controller by the corresponding CPU.

23. The data processing device according to claim 19, wherein the USB control register corresponding to a central processing unit other than the specific central processing unit can be manipulated by the specific central processing unit.

24. The data processing device according to claim 23, wherein the control information that can be manipulated by the specific central processing unit is information about an end point number and a device address.

25. The data processing device according to claim 1, having a serial interface module supporting another serial interface to be made available selectively with the USB host module.

26. The data processing device according to claim 25, wherein the serial interface module is a UART interface module.

27. The data processing device according to claim 25, wherein part of terminals coupled to the USB host module of the external terminals of the data processing device and a terminal coupled to the serial interface module are made common.

28. A data processing system, having a data processing device according to claim 27 and a device control circuit that is coupled to the data processing device via a terminal coupled to the USB host module of the external terminals of the data processing device and a terminal coupled to the serial interface module, and is also coupled to an external device detachably, wherein the device control circuit supplies a first power supply voltage or a second power supply voltage to an external device coupled to the device control circuit as an operating power supply and controls a correspondence between the external terminal coupled to the data processing device and the external terminal coupled to the external device, and wherein the data processing device instructs the device control circuit to supply the first power supply voltage to the external device and also instructs it to establish communication using a USB host module, and when there is a first reply from the external device in response to this instruction, selects the use of the USB host module and deselects the use of the serial interface module; and when the first reply is not received, instructs the device control circuit to supply the second power supply voltage to the external device and at the same time and also instructs it to establish communication using the USB host module and when there is a second reply from the external device in response to this instruction, selects the use of the USB host module and deselects the use of the serial interface module and when the second reply is not received, deselects the use of the USB host module and selects the use of the serial interface module.

29. The data processing system according to claim 28, wherein the first power supply voltage is 1.8 V and the second power supply voltage is 3.0 V.

* * * * *